United States Patent
VanAntwerp

(10) Patent No.: US 9,686,576 B2
(45) Date of Patent: Jun. 20, 2017

(54) COORDINATION OF VIDEO STREAM TIMING IN CLOUD-BASED VIDEO STREAMING SYSTEM

(71) Applicant: iStreamPlanet Co., Las Vegas, NV (US)

(72) Inventor: Mark Daniel VanAntwerp, Seattle, WA (US)

(73) Assignee: iStreamPlanet Co., Las Vegas, NV (US)

(*) Notice: Subject to any disclaimer, the term of this patent is extended or adjusted under 35 U.S.C. 154(b) by 0 days.

(21) Appl. No.: 14/708,139

(22) Filed: May 8, 2015

(65) Prior Publication Data

US 2016/0330497 A1    Nov. 10, 2016

(51) Int. Cl.
| | |
|---|---|
| *H04N 7/173* | (2011.01) |
| *H04N 21/2665* | (2011.01) |
| *H04N 21/242* | (2011.01) |
| *H04N 21/262* | (2011.01) |
| *H04N 21/234* | (2011.01) |
| *H04N 21/2365* | (2011.01) |

(52) U.S. Cl.
CPC ..... *H04N 21/2665* (2013.01); *H04N 21/2365* (2013.01); *H04N 21/23418* (2013.01); *H04N 21/242* (2013.01); *H04N 21/26208* (2013.01)

(58) Field of Classification Search
CPC ............. H04N 21/2665; H04N 21/242; H04N 21/6125; H04N 21/64761; H04N 21/2365; H04N 21/23418; H04N 21/26208
USPC ....................................................... 725/109
See application file for complete search history.

(56) References Cited

U.S. PATENT DOCUMENTS

| | | | |
|---|---|---|---|
| 5,742,821 | A | 4/1998 | Prasanna |
| 5,913,038 | A | 6/1999 | Griffiths |
| 6,110,220 | A | 8/2000 | Dave et al. |
| 6,195,680 | B1 | 2/2001 | Goldszmidt et al. |
| 6,407,680 | B1 | 6/2002 | Lai et al. |
| 6,571,282 | B1 | 5/2003 | Bowman-Amuah |
| 6,769,127 | B1 | 7/2004 | Bonomi et al. |

(Continued)

OTHER PUBLICATIONS

Non-Final Office Action, U.S. Appl. No. 14/448,915, dated Sep. 1, 2015, 20 pages.

(Continued)

*Primary Examiner* — Yassin Alata
(74) *Attorney, Agent, or Firm* — Nicholson, De Vos, Webster & Elliott, LLP

(57) ABSTRACT

A method to coordinate video stream timing is disclosed. In one embodiment, a request is received at a streaming platform coordinator (SPC) to create a plurality of synchronized media workflows for video sources. Using the plurality of video sources as input, the SPC transmits a request from the SPC to at least one video streaming platform to create the plurality of media workflows, which are assigned to a plurality of workers. The SPC causes the plurality of videos to be routed to the plurality of workers upon receiving the request to route them. The SPC then determines a set of timing offsets to synchronize the plurality of media workflows, and makes the set of timing offsets available to the plurality of workers so that the workers publish synchronized media outputs. A system to perform the method and a storage medium storing instructions to perform the method are disclosed too.

20 Claims, 14 Drawing Sheets

(56) References Cited

U.S. PATENT DOCUMENTS

| | | |
|---|---|---|
| 7,080,153 B2 | 7/2006 | Monteiro et al. |
| 7,325,232 B2 | 1/2008 | Liem |
| 7,761,591 B2 | 7/2010 | Graham |
| 7,925,781 B1 | 4/2011 | Chan et al. |
| 8,010,830 B2 | 8/2011 | Hotta et al. |
| 8,015,564 B1 | 9/2011 | Beyer et al. |
| 8,059,662 B2 | 11/2011 | Moote et al. |
| 8,135,413 B2 | 3/2012 | Dupray |
| 8,185,908 B2 | 5/2012 | Taniguchi et al. |
| 8,417,762 B2 | 4/2013 | Branson et al. |
| 8,589,992 B2 | 11/2013 | Babic |
| 8,607,091 B2 | 12/2013 | Asbun et al. |
| 8,745,628 B2 | 6/2014 | Buco et al. |
| 8,752,112 B2 | 6/2014 | Krasic et al. |
| 8,768,048 B1 | 7/2014 | Kwatra |
| 8,959,370 B2 | 2/2015 | Zomaya et al. |
| 8,964,858 B2 | 2/2015 | Boyes et al. |
| 8,984,520 B2 | 3/2015 | Liu et al. |
| 8,997,109 B2 | 3/2015 | Lee et al. |
| 9,038,086 B2 | 5/2015 | Dees |
| 9,054,911 B1 | 6/2015 | Glover et al. |
| 9,344,751 B1 | 5/2016 | Ream et al. |
| 9,407,944 B1 | 8/2016 | Galdy et al. |
| 2001/0027491 A1 | 10/2001 | Terretta et al. |
| 2002/0141584 A1 | 10/2002 | Razdan et al. |
| 2003/0142670 A1 | 7/2003 | Gould et al. |
| 2003/0163829 A1 | 8/2003 | Coufal et al. |
| 2003/0208638 A1 | 11/2003 | Abrams et al. |
| 2004/0047354 A1 | 3/2004 | Slater et al. |
| 2004/0117427 A1 | 6/2004 | Allen et al. |
| 2004/0128386 A1 | 7/2004 | Oomoto et al. |
| 2006/0195602 A1 | 8/2006 | Shibata et al. |
| 2007/0033247 A1 | 2/2007 | Martin |
| 2007/0038567 A1 | 2/2007 | Allaire et al. |
| 2007/0078768 A1 | 4/2007 | Dawson |
| 2007/0101379 A1 | 5/2007 | Pereira |
| 2007/0127667 A1 | 6/2007 | Rachamadugu |
| 2007/0153679 A1 | 7/2007 | Jost et al. |
| 2007/0211280 A1 | 9/2007 | Bansal et al. |
| 2007/0237185 A1 | 10/2007 | Pereira et al. |
| 2008/0112312 A1 | 5/2008 | Hermsmeyer et al. |
| 2008/0112336 A1 | 5/2008 | Gray et al. |
| 2008/0187285 A1 | 8/2008 | Thekkethil |
| 2008/0195743 A1 | 8/2008 | Brueck et al. |
| 2008/0225698 A1 | 9/2008 | Smith et al. |
| 2008/0307258 A1 | 12/2008 | Challenger et al. |
| 2009/0070827 A1 | 3/2009 | Barroso |
| 2009/0083279 A1 | 3/2009 | Hasek |
| 2009/0254952 A1 | 10/2009 | Sridhar et al. |
| 2009/0304004 A1 | 12/2009 | Huynh Van et al. |
| 2010/0070753 A1 | 3/2010 | Kido et al. |
| 2010/0122040 A1 | 5/2010 | Asai et al. |
| 2010/0223620 A1 | 9/2010 | Nair et al. |
| 2011/0022689 A1 | 1/2011 | Piepenbrink et al. |
| 2011/0154358 A1 | 6/2011 | Di Balsamo et al. |
| 2011/0167304 A1 | 7/2011 | Asbun et al. |
| 2011/0246621 A1 | 10/2011 | May, Jr. |
| 2011/0296473 A1 | 12/2011 | Babic |
| 2013/0064286 A1 | 3/2013 | Karlsson et al. |
| 2013/0064305 A1 | 3/2013 | Karlsson et al. |
| 2013/0103785 A1 | 4/2013 | Lyon |
| 2013/0257883 A1 | 10/2013 | Krig et al. |
| 2013/0276048 A1* | 10/2013 | Krasic ............... H04N 21/2187 725/116 |
| 2015/0103837 A1 | 4/2015 | Dutta et al. |
| 2015/0105148 A1 | 4/2015 | Consul et al. |
| 2015/0281032 A1 | 10/2015 | Bragstad et al. |
| 2016/0034306 A1 | 2/2016 | Galdy et al. |
| 2016/0036693 A1 | 2/2016 | Galdy et al. |
| 2016/0036886 A1 | 2/2016 | Ito |
| 2016/0080460 A1 | 3/2016 | Chung et al. |
| 2016/0192029 A1 | 6/2016 | Bergstrom |
| 2016/0352603 A1 | 12/2016 | VanAntwerp et al. |

OTHER PUBLICATIONS

Liang et al., "Cross-Tree Adjustment for Saptialized Audio Streaming over Networked Virtual Environments", ACM, pp. 73-78, 2003.
Iqbal et al., "An Analytical Approach to Model Adaptive Video Streaming and Delivery", ACM, pp. 55-58, 2010.
Non-Final Office Action, U.S. Appl. No. 14/448,996, dated Mar. 15, 2016, 22 pages.
Notice of Allowance, U.S. Appl. No. 14/448,915, dated Apr. 13, 2016, 10 pages.
Notice of Allowance, U.S. Appl. No. 14/708,135, dated Mar. 21, 2016, 30 pages.
Chen, et al., "A Directed Acyclic Graph based Detection for RBAC Based Secure Interoperation", IEEE, pp. 759-764, 2009.
Rao, et al, "Association Rule Mining Using FPTree as Directed Acyclic Graph", IEEE ICAESM, pp. 202-207, Mar. 30-31, 2012.
Roig, et al, "A New Task Graph Model for Mapping Message Passing Applications", IEEE Transactions on Parallel and Distributed Systems, vol. 18, No. 12, pp. 1740-1753, Dec. 2007.
Tao, et al., "Directed Acyclic Graph Version Model Applied in Product Structure Configuration", IEEE, pp. 1-4, 2008.
"AT&T Enhances its Digital Media Solutions Portfolio With New Features That Expand Content Management and Delivery Capabilities", iStreamPlanet, Articles, http://www.istreamplanet.com/NewsItem.aspx?nid=113, (Apr. 13, 2010), 2 pages.
"iStreamPlanet Announces Flash Media Server 3.5 and HTTP Dynamic Streaming Support for the Adobe Flash Platform", iStreamPlanet, Articles, http://www.istreamplanet.com/NewsItem.aspx?nid=115, (May 11, 2010), 2 pages.
"iStreamPlanet announces official integration of Microsoft Silverlight Rough Cut Editor (RCE) into its Video Workflow Automation Platform (VWAP)", iStreamPlanet, Articles, http://www.istreamplanet.com/NewsItem.aspx?nid=110, (Mar. 12, 2010), 2 pages.
"iStreamPlanet announces Release of its Video Workflow Automation Platform", iStreamPlanet, Articles, http://www.istreamplanet.com/NewsItem.aspx?nid=107, (Mar. 15, 2010), 2 pages.
"iStreamPlanet Announces Support for Microsoft Silverlight 4", iStreamPlanet, Articles, http://www.istreamplanet.com/NewsItem.aspx?nid=111, (Apr. 13, 2010), 2 pages.
"iStreamPlanet selected by NBC Sports to Provide Live Web Broadcast Experience of The 2010 US Open Golf Tournament at Pebble Beach and Championships 2010 at Wimbledon", iStreamPlanet, Articles, http://www.istreamplanet.com/NewsItem.aspx?nid=120, (Jun. 29, 2010), 2 pages.
"Record Interactive and Online Viewing for CTVOlympics.ca & RDSolympiques.ca: The Vancouver 2010 Olympic Winter Games in Review", iStreamPlanet, Articles, http://www.istreamplanet.com/NewsItem.aspx?nid=109, (Mar. 18, 2010), 2 pages.
"Spinnaker HD/7100", Inlet Technologies, www.InletHD.com., (May 2010), 2 pages.
"Spinnaker HD-X/8100", Inlet Technologies, www.InletHD.com., (May 2010), 2 pages.
"Spinnaker IP/6000", Inlet Technologies, www.InletHD.com., (May 2010), 2 pages.
Office Action, U.S. Appl. No. 12/789,106, dated Apr. 11, 2012, 26 pages.
Final Office Action, U.S. Appl. No. 12/789,106, dated Aug. 27, 2012, 30 pages.
Notice of Allowance, U.S. Appl. No. 12/789,106, dated Jul. 5, 2013, 22 pages.
Final Office Action, U.S. Appl. No. 14/448,915, dated Jan. 21, 2016, 11 pages.
Supplemental Notice of Allowance, U.S. Appl. No. 14/708,135, dated Apr. 19, 2016, 4 pages.
Notice of Allowance for U.S. Appl. No. 14/708,128, mailed May 11, 2016, 30 pages.
Final Office Action, U.S. Appl. No. 14/448,996, dated Oct. 20, 2016, 16 pages.
Advisory Action, U.S. Appl. No. 14/448,996, dated Dec. 14, 2016, 5 pages.
Non-Final Office Action from U.S. Appl. No. 14/725,919, mailed Feb. 10, 2017, 38 pages.

(56) References Cited

OTHER PUBLICATIONS

Non-Final Office Action from U.S. Appl. No. 14/448,981, mailed Mar. 23, 2017, 51 pages.
Non-Final Office Action from U.S. Appl. No. 14/448,996, mailed Mar. 23, 2017, 19 pages.

* cited by examiner

COORDINATION OF VIDEO STREAM TIMING IN CLOUD-BASED VIDEO STREAMING SYSTEM

RELATED APPLICATIONS

This application is related to U.S. application Ser. No. 14/708,128 filed May 8, 2015 (now U.S. Pat. No. 9,407,944 issued Aug. 2, 2016), and U.S. application Ser. No. 14/708,135 filed May 8, 2015 (now U.S. Pat. No. 9,344,751 issued May 17, 2016), which are incorporated herein by reference.

FIELD OF INVENTION

The embodiments of the invention are related to the field of delivering media contents over a cloud computing environment. More specifically, the embodiments of the invention relate to methods and system for coordinating video stream timing in a cloud-based video streaming system.

BACKGROUND

Cloud computing is now ubiquitous in both enterprise and consumer settings. In cloud computing, data and applications are accessed over the Internet instead of requiring local storage and compute resources, and instead of owning all the hardware where the data resides and the software applications execute, an enterprise or a consumer (the "client" or "tenant") utilizes hardware and software resources supplied by a cloud computing provider to store the data and run the applications. Relying on sharing of resources among numerous clients, the cloud computing infrastructure (sometimes referred to as Infrastructure as a service (IaaS)) satisfies elastic demand spikes and achieves economies of scale thus becoming popular in various industries. In an IaaS model, computing resources are often offered as a number of virtual machines to a client requesting computing resources, and a hypervisor manages the offered virtual machines.

For media content processing, a video streaming system may utilize the cloud computing infrastructures offered by the cloud computing providers to provide services to a client. An operator of the video streaming system often is not the cloud computing providers. Thus a client may reach a service level agreement (SLA) with the operator of the video streaming system, and the operator of the video streaming system leases computing resources within the cloud computing infrastructures to process media contents from the client. Media contents often have strict timing requirements and a client may require fault-tolerance from a failure of a video streaming platform, thus it is challenging for the operator of the video streaming system to process media contents.

For example, it is challenging to offer fault-tolerant media content processing. In order to provide fault-tolerance from a failure, it is desirable for the operator of the video streaming system to process a single video source in multiple video streaming platforms so that when one video streaming platform fails, another may take over automatically without human intervention. Yet, the coordination of the multiple video streaming platforms requires delicate coordinating the single video source to arrive at the multiple video streaming platforms and output from the multiple video streaming platforms to a single content distribution network (CDN), which is challenging.

Additionally, it is challenging to synchronize multiple media content streams. For example, for sporting events, it is common that media contents from multiple angles of the same event are fed to one or more video streaming platforms as multiple video sources of the video streaming system. The media contents from multiple angles of the same event typically pass through different paths prior to reach to the one or more video streaming platforms, thus the media contents are out of synchronization from each other when they arrive at the one or more video streaming platforms. Yet, since it is desirable for the media contents from the multiple angles of the same events to be synchronized when it is distributed to the CDN. Thus the one or more video streaming platforms need to coordinate the timing of multiple media content streams.

SUMMARY

A method for coordinating video stream timing in a cloud-based video streaming system is disclosed. The method is executed by an electronic device implementing a streaming platform coordinator (SPC) to coordinate processing of a plurality of video sources originated from a plurality of video output devices to broadcast an event concurrently. The method includes receiving a request to create a plurality of media workflows for the plurality of video sources, where the plurality of media workflows are to be synchronized. Responsive to receiving the request at the SPC to create the plurality of media workflows, a request from the SPC to at least one video streaming platform is transmitted to create the plurality of media workflows using the plurality of video sources as input, where the plurality of media workflows are assigned to a plurality of workers. The method further includes receiving requests from the at least one video streaming platform to route the plurality of video sources to the plurality of workers; causing the plurality of video sources to be routed to the plurality of workers; and making the set of timing offsets available to the plurality of workers, where the plurality of workers apply the set of timing offsets so that output of the plurality of media workflows are synchronized.

An electronic device to coordinate video stream timing in a cloud-based video streaming system is disclosed. The electronic device serves as a streaming platform coordinator (SPC) to coordinate processing of a plurality of video sources originated from a plurality of video output devices to broadcast an event concurrently. The electronic device receives a request to create a plurality of media workflows for the plurality of video sources, where the plurality of media workflows are to be synchronized. Responsive to receiving the request at the SPC to create the plurality of media workflows, the electronic device transmits a request from the SPC to at least one video streaming platform to create the plurality of media workflows using the plurality of video sources as input, where the plurality of media workflows are assigned to a plurality of workers. The electronic device then receives requests from the at least one video streaming platform to route the plurality of video sources to the plurality of workers, causes the plurality of video sources to be routed to the plurality of workers. The electronic device also determines a set of timing offsets to synchronize the plurality of media workflows and makes the set of timing offsets available to the plurality of workers, where the plurality of workers apply the set of timing offsets so that output of the plurality of media workflows are synchronized.

A non-transitory machine-readable storage medium to coordinate video stream timing in a cloud-based video streaming system is disclosed is disclosed. The storage medium has instructions stored therein, which when executed by a processor, cause the processor to perform operations in an electronic device. The electronic device implements a streaming platform coordinator (SPC) to coordinate processing of a plurality of video sources originated from a plurality of video output devices to broadcast an event concurrently. The operations include receiving a request to create a plurality of media workflows for the plurality of video sources, where the plurality of media workflows are to be synchronized. Responsive to receiving the request at the SPC to create the plurality of media workflows, a request from the SPC to at least one video streaming platform is transmitted to create the plurality of media workflows using the plurality of video sources as input, where the plurality of media workflows are assigned to a plurality of workers. The operations further include receiving requests from the at least one video streaming platform to route the plurality of video sources to the plurality of workers; causing the plurality of video sources to be routed to the plurality of workers; and making the set of timing offsets available to the plurality of workers, where the plurality of workers apply the set of timing offsets so that output of the plurality of media workflows are synchronized.

Embodiments of the disclosed techniques determine timing offsets of a plurality of video sources so that the plurality of video sources may be synchronized even if the plurality of video sources are processed concurrently by multiple video streaming platforms.

DETAILED DESCRIPTION

Figure 1:
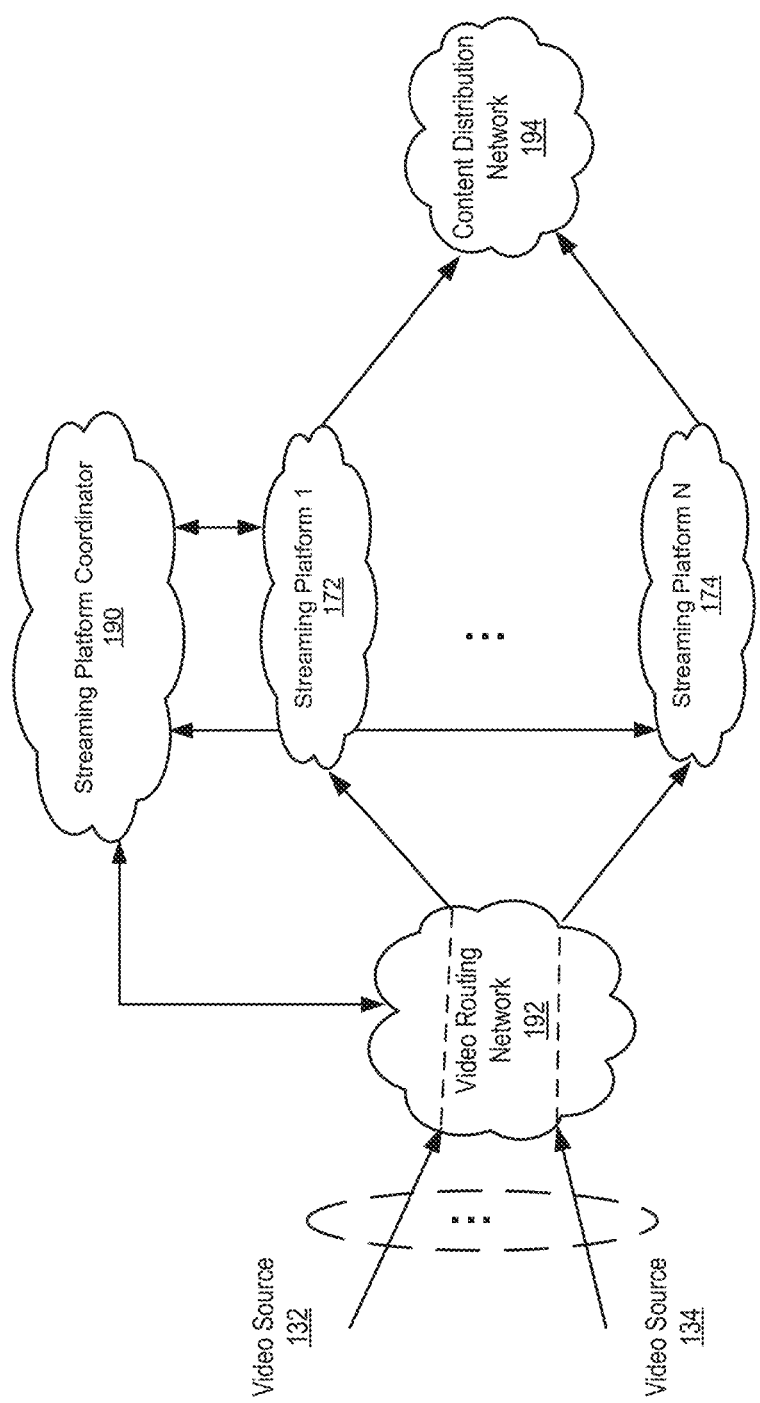
FIG. 1 illustrates a video streaming system containing multiple video streaming platforms according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming System in a Cloud Computing Environment

FIG. 1 illustrates a video streaming system containing multiple video streaming platforms according to one embodiment of the invention. A video streaming system 100 includes a video routing network 192, multiple video streaming platforms represented by a streaming platform 1 and a streaming platform N at references 172 and 174, a content distribution network 194, and a streaming platform coordinator 190.

The video routing network 192 routes video sources 132 and 134 to different video streaming platforms. The video routing network 192 communicates with the streaming platform coordinator 190, which may request the video routing network 192 to route the video sources to one or more specific video streaming platforms at a specific time.

The streaming platform coordinator 190 also communicates with all the video streaming platforms including the streaming platforms 1 and N. The streaming platform coordinator 190 coordinates processing of the media contents routed to the various video streaming platforms. The processed media contents from the video sources are then published to the content distribution network 194.

It is to be noted that the various video streaming platforms and/or the streaming platform coordinator may be hosted by various cloud computing providers such as Amazon.com®, Microsoft®, Google®, CenturyLink®, Rackspace®, or Computer Sciences Corporation (CSC®). When two video streaming platforms are hosted by two different cloud computing providers, which generally offer computing resources with different characteristics, the two video streaming platforms are often referred to as heterogeneous video streaming platforms (versus homogenous video streaming platforms hosted by the same cloud computing providers). Cloud computing providers are building up their infrastructures at various geographic locations, and it is now practical for the video streaming system to utilize the cloud infrastructures concurrently at the various geographic locations and/or by different cloud computing providers.

A client of the video streaming system may require its video sources to be processed with a high level of availability. For example, when the video sources are media streams from a live sporting event, service interruption due to a failure of a video streaming platform, even if lasting only a minute, is intolerable. Thus, in the service level agreement (SLA) between the client and the operator of the video streaming system, the required service availability may be very high (e.g., 99.99% or more). In order to reach such a high level of service availability, the video streaming system may route the video sources concurrently to multiple video streaming platforms at different physical locations so that a single video source may be processed concurrently and then the resulting media content published to the content distribution network 194.

One challenge is that the concurrent processing of the single video source may result in publishing of the same media content multiple times to the content distribution network 194, which may be unable to synthesize a single congruent media content from the concurrent outputs of the multiple video streaming platforms. Thus, it is desirable for the streaming platform coordinator to cause only one of the multiple video streaming platforms to publish to the content distribution network 194 at a given time, thus the content distribution network 194 is unware of whether there are one or multiple video streaming platforms processing the video source.

Video Streaming Platform in a Cloud Computing Environment

Figure 2:
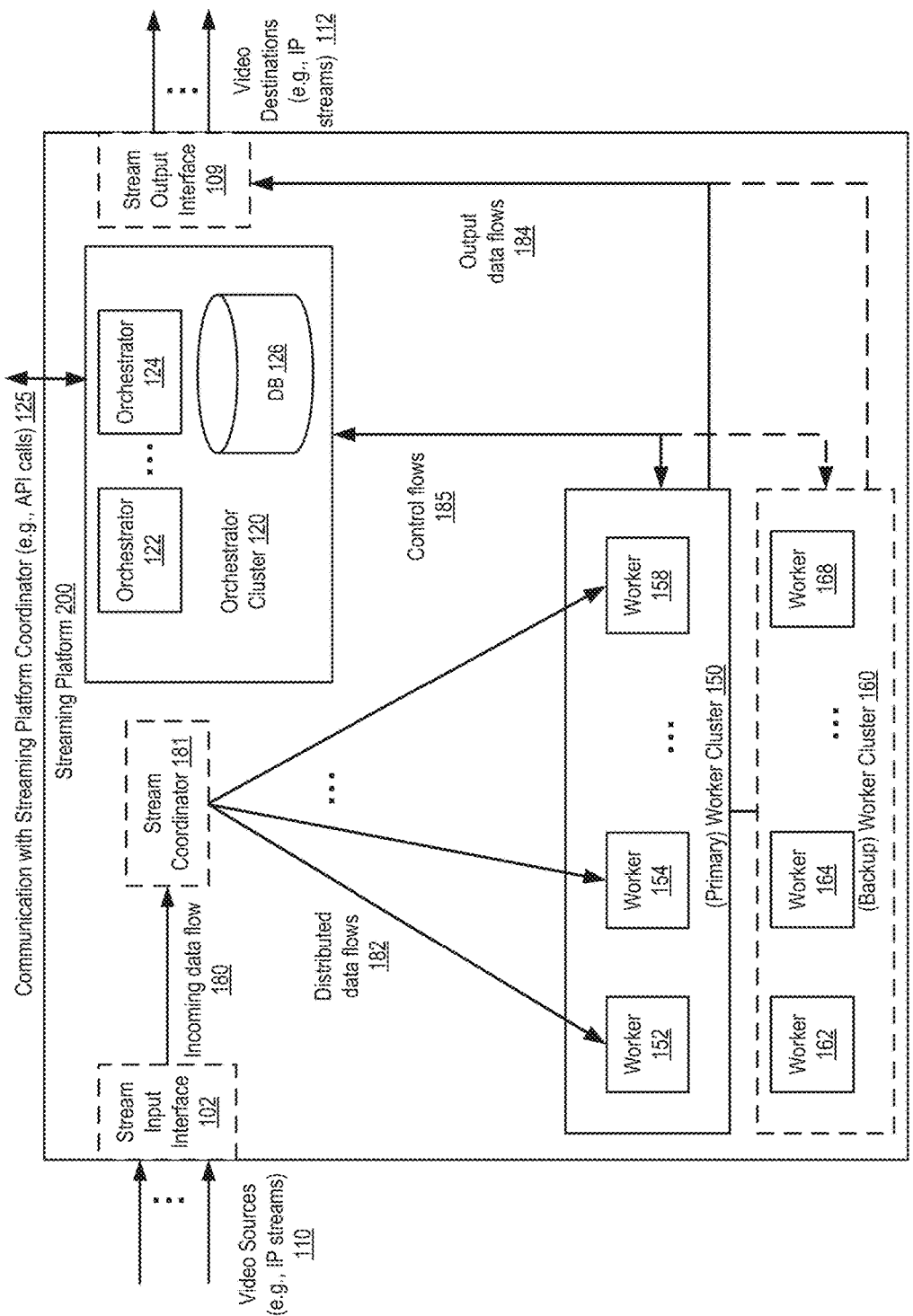
FIG. 2 illustrates a video streaming platform in a cloud computing environment according to one embodiment of the invention.

A video streaming platform is a main component of a video streaming system as illustrated in FIG. 1. The architecture of the video streaming platform and its operations thus warrant a more detailed discussion. FIG. 2 illustrates a video streaming platform in a cloud computing environment according to one embodiment of the invention. A streaming platform 200 (also referred to as a video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 190) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 102 in one embodiment. For example, video sources to be processed by the streaming platform 200 enters through the stream input interface 102. A video source contains one or more Internet Packet (IP) packet streams in one embodiment. The IP packet streams may contain one or more live video feeds. A live video feed may be video of a live event or live performance, or may be video of a prerecorded event being played back according to a schedule. The live video feed may be a video broadcasted over cable, satellite, or over-the-air. It is to be noted that the terms "video source," "video stream," and "video feed," as used interchangeably herein, refer to the video and corresponding audio of the particular recorded event (e.g., TV show, live performance, sporting event, etc.), but also may include video only. Additionally the video source (sometimes referred to as the video and audio streams) of the streaming platform 200 may contain only audio (e.g., an Internet radio stream). The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD). In one embodiment, the video sources 132 and/or 134 that are routed through the video routing network 192 in FIG. 1, and they become the video sources 110 after they are processed in the video routing network 192 (e.g., adding/removing metadata in packet headers of the video sources).

A video source may be "pushed" to the streaming platform 200 where the video source is IP packet streams such as the MPEG-transport streams (MPEG-TS). The IP packet streams logically flow to streaming platform 200 from an external source thus the video source is referred to as being pushed to the streaming platform 200.

A video source may also be "pulled" by a processing unit (referred to as a worker) of streaming platform 200, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 170. The pull of video feeds may be implemented through the real time messaging protocol (RTMP), where the processing task includes a RTMP capture task.

The stream input interface 102 is a logical input point for data flows into the streaming platform 200. It may not be present as a physical entity of the streaming platform 200 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 181, which converts unicasts data flow into distributed data flows 182.

Workers may be organized as worker clusters in a streaming platform. In the streaming platform 200, workers 152-158 are in a primary worker cluster 150, which contains workers actively working on processing tasks. Workers 162-168 are in a backup worker cluster 160, which contains workers remains standby thus provides redundancy and robustness for the streaming platform 200. Workers perform tasks through coordination with one or more orchestrators, which may form an orchestrator cluster such as an orchestrator cluster 120. The orchestrator cluster 120 interacts with worker clusters 150-160 through a control flow 185.

The orchestrator cluster 120 contains orchestrators 122-124 and an orchestrator database 126 that stores data for operations of the orchestrators. The orchestrators may form load-balanced group within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 200, and it may also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In alternative, a database outside of the orchestrator cluster 120 may store the information for the operations by the orchestrator 122-124 and/or orchestrator cluster 120 (e.g., the database may be stored in a streaming platform coordinator such as the streaming platform coordinator 190 in FIG. 1).

Workers are coupled to one or more orchestrators, and the workers execute processing tasks on the distributed data flows 182. The data flows are processed and the workers produce output data flows 184. The output data flows 184 may optionally transmit to a stream output interface 109, a logical output point for the data flows going out of the streaming platform 200. Note both the stream input interface 102 and the stream output interface 109 may be integrated into parts of worker functions and they may not be individual physical units of the streaming platform 200.

Output data flows goes to video destinations 112, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider and they may concurrently host applications other than the video streaming platform. Thus, the worker hosts are not dedicated to the streaming platform and they are allocated to the streaming platform as needed and according to coordination of the orchestrators.

For the streaming platform 200, a graph of tasks is used to process a workflow. A workflow, also referred to as a channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Figure 3:
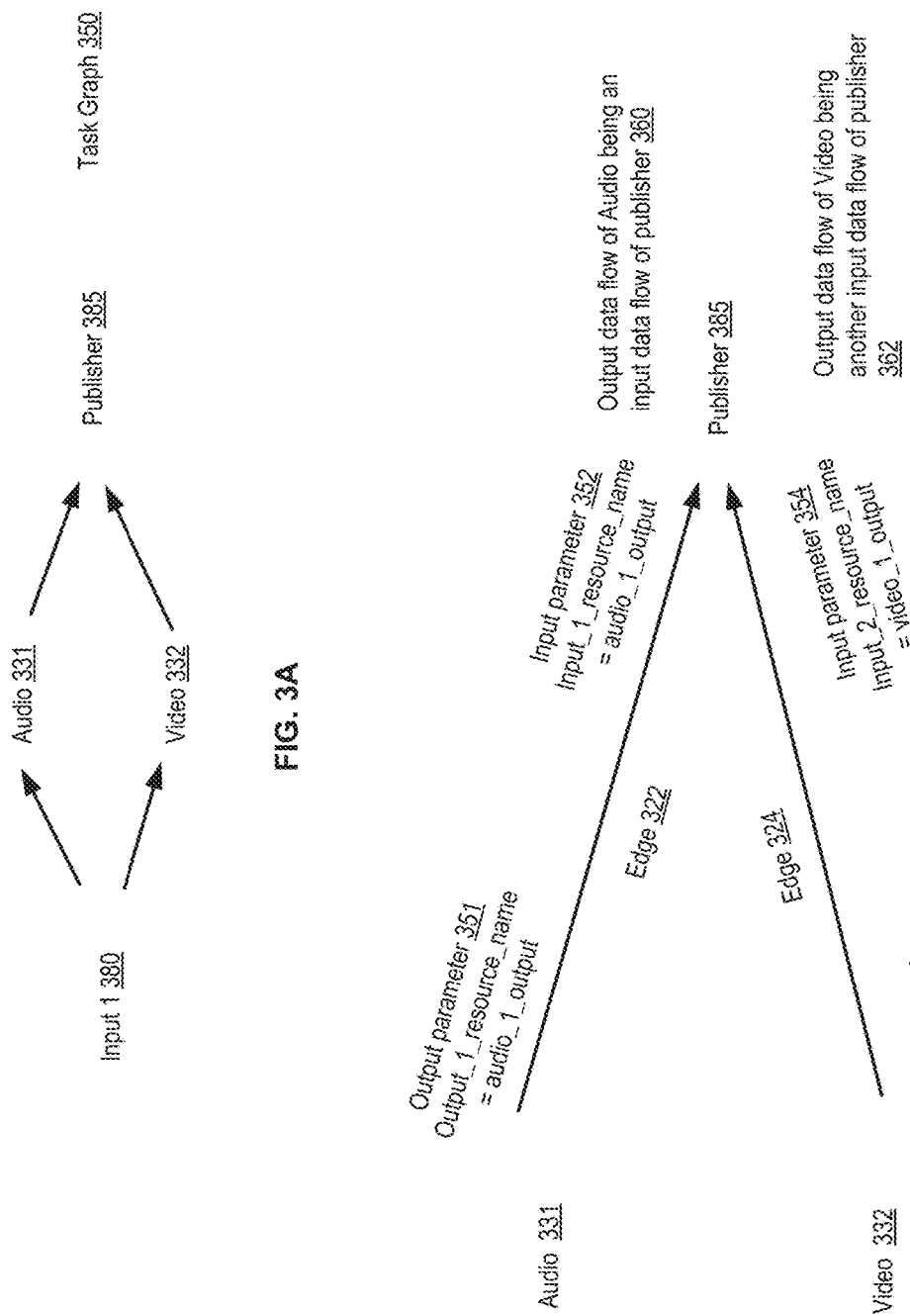
FIG. 3A illustrates an exemplary task graph according to one embodiment of the invention.
FIG. 3B illustrates the relationship between adjacent nodes in a portion of a task graph according to one embodiment of the invention.

FIG. 3A illustrates an exemplary task graph according to one embodiment of the invention. Task graph 350 contains one input node, an input 1 at 380. The input 1 represents an input processing task (sometimes referred to as an ingest task), which is to receive and prepare the video source for further processing. The output of the input 1 is sent to an audio 331 and a video 332. The nodes of the audio 331 and video 332 represent processing tasks associated with the respective audio and video layers of the video source. After the audio and video are processed through transcoding operations at 331-332 (sometimes referred to as audio transcoding and video transcoding respectively), the outputs are sent to a publisher 385, where the processing task is to publish the processed video source in desired output format(s) to the desired destination(s). While the majority of the nodes of task graph 350 only have a single input and/or a single output, the layout is for simplicity of illustration. A task graph may contain tens or even hundreds of nodes, and each node may have multiple inputs and multiple outputs.

FIG. 3B illustrates the relationship between adjacent nodes in a portion of a task graph according to one embodiment of the invention. The illustrated portion of the task graph is a portion of task graph 350 in FIG. 3A, and the illustrated portion includes the audio 331, the video 332, the publisher 385, and edges 222-224. The Audio 331 produces one output. The output contains an output parameter 351, which is referred to by an output resource name (output_1_resource_name) and the value is audio_1_output. Represented by the edge 322, the output of the audio 331 is an input of the publisher 385, and that input contains an input parameter 352, which is referred to by an input resource name (input_1_resource_name), and the value of the input parameter to the publisher 385 is the same as the value of the output parameter 351, audio_1_output. Similarly, the video 332 produces an output containing an output parameter 353, which is referred to as output_1_resource_name, and the value is video_1_output. The output of the video 332 is another input of publisher 385, and that input contains an input parameter 354, which is referred to by input_2_resource_name and its value is the same (video_1_output).

It is to be noted that while the input and output parameters in the example are single values respectively, some edges of a task graph may contain a plurality of input parameters and/or a plurality of output parameters, in which case the input parameters and output parameters are referred to as the input parameter set and the output parameter set respectively. Each of the input and output resource names represents resource(s) involved for the respective inputs and outputs. The reading and writing of the inputs and outputs are done via API calls to a service called the segment store that runs on every worker in one embodiment.

It is also to be noted that each node in a task graph represents a task to be performed by a worker in a video streaming platform such as the streaming platform 200. In some embodiments, all the tasks in the task graphs may be performed by a single worker. The single worker may be implemented in a virtual machine by a computing device with a more powerful processor such as an Intel® Haswell processor with 18+ cores, or it may be implemented in a virtual machine by a computing device with an aggregation of less powerful processors such as a set of Intel® Xeon E3-1200 processors assembled in a compact rack. In some embodiments, the single worker is implemented by a computing device with an integrated GPU.

Overall, the streaming platform 200 ingests video sources, transcodes, and transforms the video sources into desired one or more formats for publication and then outputs the resulting video data. The video streaming platform is a distributed architecture using cloud resources, and it is a flexible, scalable, and efficient platform for video processing.

Referring back to FIG. 2, the streaming platform 200 communicates with a streaming platform coordinator through 125, which may include sending requests/confirmations from the streaming platform coordinator and updates/responses from the streaming platform 200. The communication may be in the form of application programming interface (API) calls. One of the requests from the streaming platform coordinator is a request create a workflow for a video source in the streaming platform 200. The request (may be referred to as a channel creation request) may contain a variety of parameters describing the video source and the expected operations. For example, the request may contain at least one of the following:

- Mandatory parameters describing the type of the video source (e.g., MPEG-2, MPEG-4, H.265, and etc.), and location of the video source (e.g., ingest protocol, IP address, URI, and etc.).
- Indication of whether and how to enable subtitle processing and/or enable advertisement insertion processing for the video source.
- The desired video and audio transcoding operations (e.g., how many audio/video layers, the desired output characteristics for each such as video frame size/rate and bitrate, the relevant portion of the incoming data flow to use if applicable) for the video source.
- The desired contention protection operations for the published output (e.g., Microsoft© PlayReady, Adobe© Access DRM, AES-128 Encryption for HTTP live streaming, etc.).
- The desired publishing operations to output (e.g., which output format(s) such as HTTP live streaming (HLS), HTTP dynamic streaming (HDS), RTMP, or Microsoft© smooth streaming) to publish, and the destination(s) to send each output format.

Based on the request, the orchestrator cluster 120 creates media workflows for video sources 110, utilizing directed graphs of tasks, and each of the so called task graphs is a directed acyclic graph (DAG) of tasks for processing the video source. Each task graph contains tasks to be performed by a worker of the streaming platform 200. The tasks are then assigned to workers for execution, and the results are included in the output data flows 184.

Coordination of Multiple Video Streaming Platforms

Figure 4:
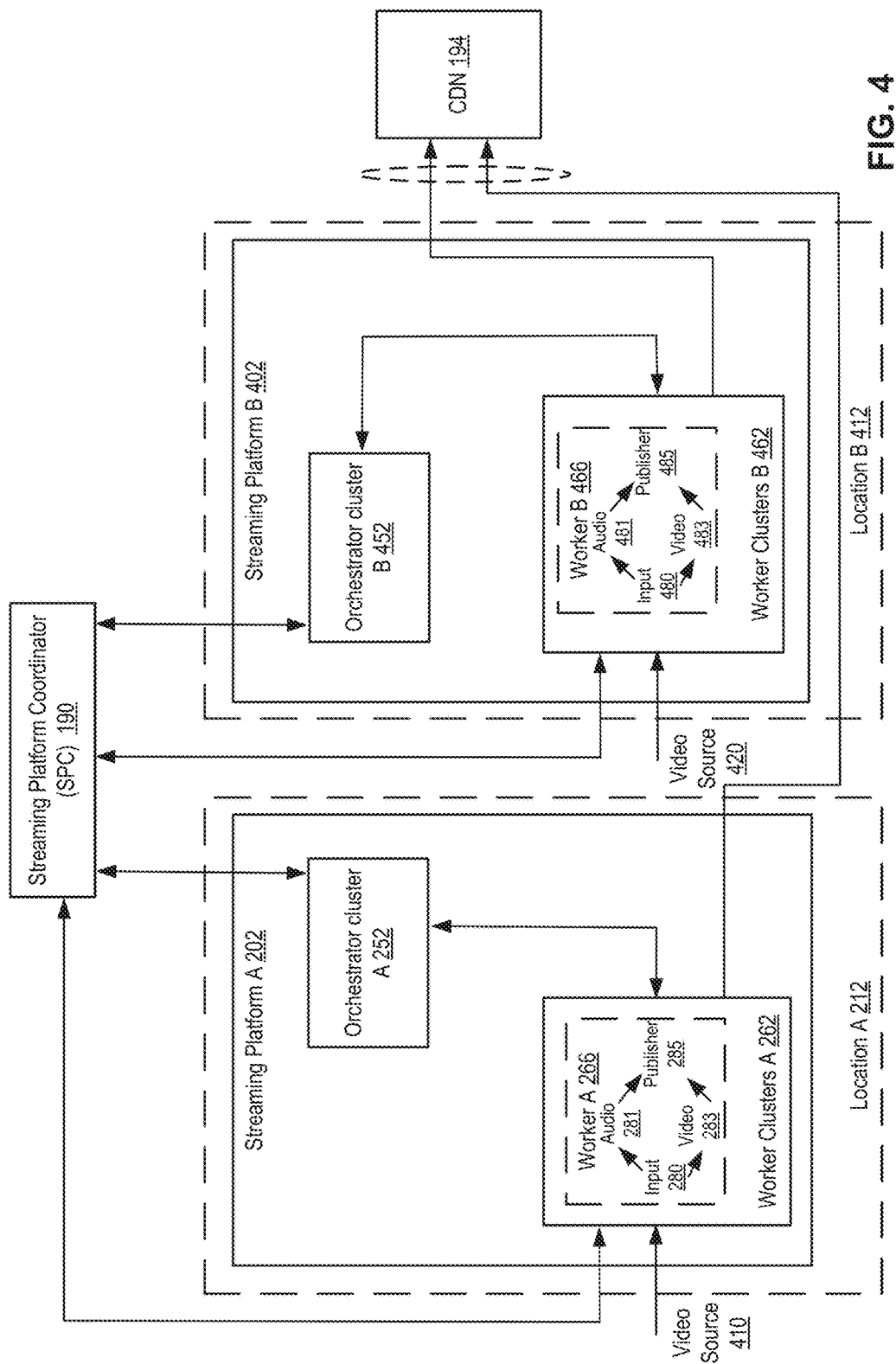
FIG. 4 illustrates the coordination of two video streaming platforms by a streaming platform coordinator according to one embodiment of the invention.

The coordination of multiple video streaming platforms warrants detailed discussion as the coordination by the streaming platform coordinator provides ways for the multiple video streaming platforms to work together. FIG. 4 illustrates the coordination of two video streaming platforms by a streaming platform coordinator according to one embodiment of the invention. The streaming platform coordinator 190 and the content distribution network 194 are the same ones as discussed in relation to FIG. 1.

The streaming platform A at reference 202 and the streaming platform B at reference 402 are two video streaming platforms similar to the streaming platform 200 as discussed herein above. However, certain aspects of FIG. 2 have been omitted from FIG. 4 in order to avoid obscuring other aspects of FIG. 4. Additionally, in the streaming platform A, an orchestrator cluster A and a worker clusters A are illustrated with references 252 and 262 respectively; in the streaming platform B, an orchestrator cluster B and a worker clusters B are illustrated with references 452 and 462 respectively. The changes of reference numbers are for contrasting the two video streaming platforms. Within the worker clusters A and B, workers A and B are illustrated at references 266 and 466, representing workers performing assigned tasks. A video source 410 and a video source 420 are routed to the streaming platforms A and B respectively. These video sources are similar to video sources 110 in FIG. 2.

The streaming platform A is at a location A while the streaming platform B is at a location B as illustrated at references 212 and 412. The locations A and B may be at separate geographic locations (e.g., the two video streaming platforms are miles apart from each other), but the locations A and B may also be close by and the two video streaming platforms are just installed at two different rack spaces. The physical separation is desirable even when the two video streaming platforms are close by so that a hardware failure (e.g., a circuit board failure) at one platform would not affect the other platform. The geographic separation is even better for fault-tolerance purpose as events specific to one location (e.g., power or network outage) would not affect the other platform.

The two video streaming platforms may protect each other in a 1+1 mode, that is, the video processing at one video streaming platform is duplicated at the other video streaming platform. The two video streaming platforms may also protect each other in a 1:1 mode, where an active video streaming platform processes video sources while the standby video streaming platform may be idle until the active video streaming platform fails.

It is to be noted that even though only two video streaming platforms are illustrated, more than two video streaming platforms may work together for robust video processing. In that case, the streaming platform coordinator 190 coordinates the more than two video streaming platforms to operate at N:1 mode, where N≥2 and N is the number of active video streaming platforms processing the video sources. Additionally, the disclose techniques discussed herein, although use two video streaming platforms as examples, are applicable to the video streaming systems with three or more video streaming platforms coordinated by a streaming platform coordinator.

Operations for Coordinating Multiple Video Streaming Platforms

Figure 5:
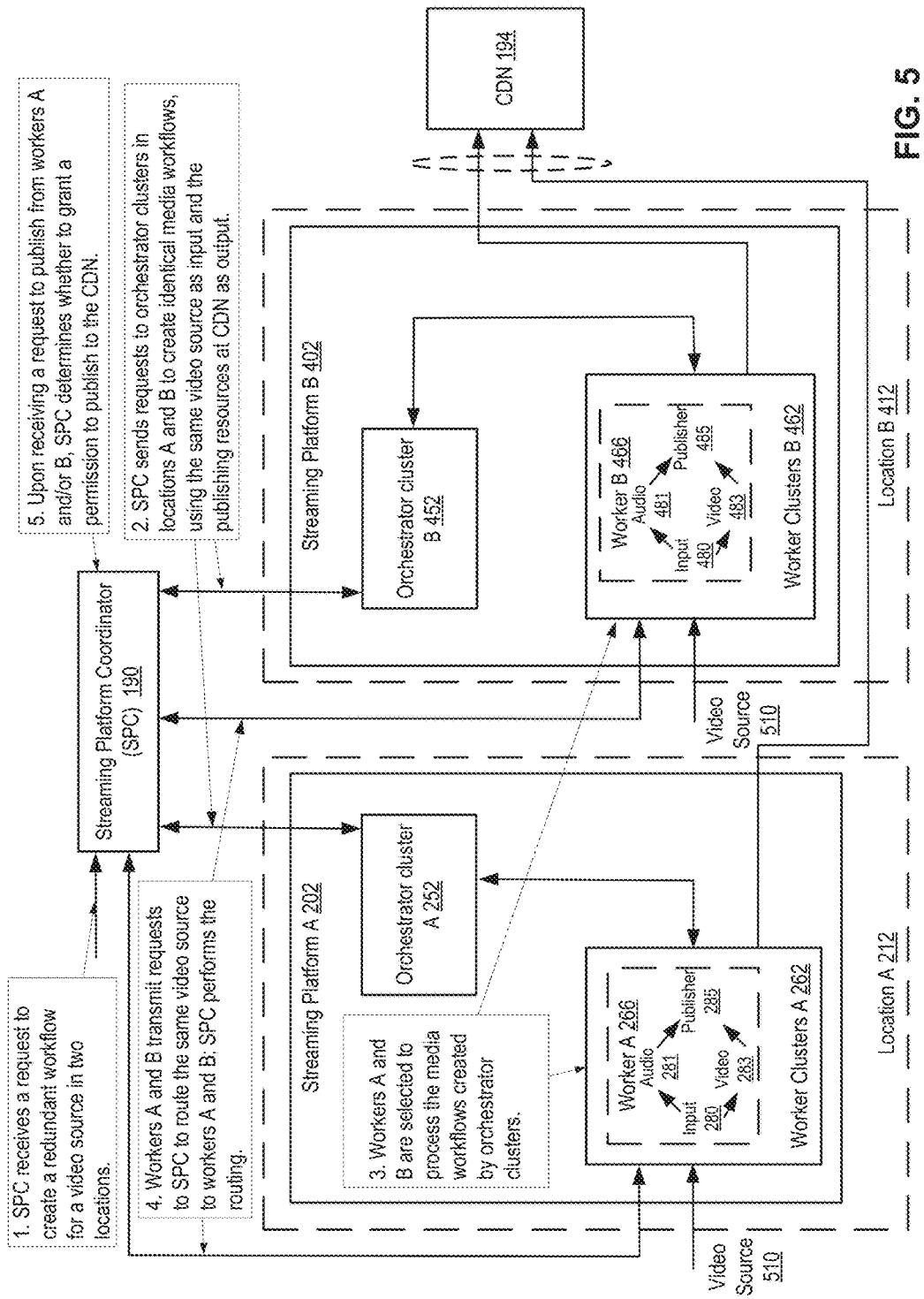
FIG. 5 illustrates operations for coordinating multiple video streaming platforms according to one embodiment of the invention.

FIG. 5 illustrates operations for coordinating multiple video streaming platforms according to one embodiment of the invention. FIG. 5 is similar to FIG. 4, and the same or similar references indicate elements or components having the same or similar functionalities. Task boxes 1 to 5 illustrate the order in which operations are performed according to one embodiment of the invention.

At task box 1, the streaming platform coordinator 190 receives a request to create a redundant workflow for a video source at two locations. The request may be from a client, which requires the video source to be fault tolerant; and the request may also from the operator of the video streaming system, which based on the client that requests to process the video source and the agreed upon SLA, determines that the video workflow needs to be fault tolerant.

At task box 2, the streaming platform coordinator 190 transmits two requests to create the redundant workflows, one each to the streaming platforms A and B at references 202 and 402 respectively. The requests are sent to the orchestrator clusters A and B at references 252 and 452 respectively in one embodiment. Each of the orchestrator clusters A and B then creates a task graph for an instance of the redundant workflow at their respective video streaming platforms, where each instance of the workflow uses the same video source 510 as input (the video source 510 is shown to be the input to both streaming platforms A and B) and the publishing resources at the content distribution network 194 as output.

As discussed herein above, the task graph is a directed acyclic graph of tasks with each node of the task graph representing a media processing task and each edge of the task graph representing a data flow across two tasks and a corresponding input and output of each task.

When the streaming platform coordinator 190 coordinates operations of more than two video streaming platforms (e.g., as illustrated in FIG. 1), the streaming platform coordinator 190 may select the streaming platforms A and B based on the streaming platform coordinator's own load balancing scheme (e.g., round-robin, random selection). In alternative, the request received at the streaming platform coordinator 190 may dictate the video streaming platforms to be used for the video source. Additionally, the streaming platform coordinator 190 may make the selection based on the characteristics of the video source (e.g., from which client at what particular SLA agreed upon) and the characteristics of the video streaming platforms (e.g., locations, terms offered by the associated cloud computing providers, and/or availability).

At the streaming platforms A and B, the orchestrator clusters A and B identify the available one or more workers at each streaming platform for executing the task graph created for their respective instance of the media workflow. The identification may be through the workers polling, where the available workers notify the orchestrator clusters of the workers' availability; and it may also be through the orchestrator clusters polling, where the orchestrator clusters periodically contact the workers and determine their availability. In this example, the workers A and B at references 266 and 466 are identified and assigned to execute the task graph created for the respective instance of the media workflow in the streaming platforms 202 and 402 respectively at task box 3.

At task box 4, the identified workers A and B transmits their requests to the streaming platform coordinator 190 to route the video source to the workers A and B. Workers in the video streaming platforms have no direct knowledge of routing performed outside of the video streaming platform hosting them, thus the streaming platform coordinator 190 performs the task of routing the video source properly to the workers. As illustrated in FIG. 1, the streaming platform coordinator 190 may communicate with the video routing network 192 in order to facilitate the routing of video sources to various video streaming platforms. In one embodiment, the video routing network 192 includes a routing apparatus (e.g., an electronic device such as a router/switch) that the streaming platform coordinator 190 directs its request to route the video source to the multiple workers at different video streaming platforms.

Once the workers A and B receive the video source to input to their own instances of the media workflow, the workers perform tasks of the task graphs. It is to be noted that while only one worker in each video streaming platform is illustrated for performing the tasks of the task graph, more than one worker in each video streaming platform may perform tasks of a given task graph (e.g., each worker perform tasks of a task group); however, only one worker in each video streaming platform may publish for each output of the media workflow corresponding to a publishing task of the task graph, see for example U.S. patent application Ser. No. 14/448,915, entitled "A Method and System for a Graph Based Video Streaming Platform," incorporated by reference herein.

At each of the streaming platforms A and B, while performing publishing tasks of the task graph, workers A and B will publish the output of the media workflow to the content distribution network 194. In one embodiment, both workers A and B are notified that the publishing task they are assigned to execute is a publishing task that requires coordinated publishing. The notification may be associated with the task graph corresponding to the instance of the media workflow, so that by performing publishing task of the task graph, a worker is aware of the need to ask for a permission.

For example, the publishing task of the task graph is assigned with a coordination identifier (ID) by the streaming platform coordinator and the coordination ID is a parameter of the publishing tasks so that both workers are aware of the need to ask for the permission when they perform the publishing tasks. Once the workers are ready to publish to the content distribution network 194, the workers send a request to the streaming platform coordinator 190.

At task box 5, the streaming platform coordinator 190 determines whether to grant a permission to publish upon receiving a request from a worker, so that only one worker for a publishing task of the redundant workflow will publish at a given moment. It is to be noted that the redundant workflow may contain multiple publishing tasks (e.g., publishing to different CDN endpoints or publishing in different formats concurrently), and the permission is granted at per publishing task basis. Thus, in this example, it can happen that worker A will publish a first output of the redundant media workflow and worker B will publish a second output of the redundant media workflow.

It is to be noted that FIG. 5 illustrates the coordination of the multiple video streaming platforms using two streaming platforms 202 and 402 as an example. In an alternative embodiment, more than two video streaming platforms may be coordinated by the streaming platform coordinator 190 to process a video source concurrently using the same techniques disclosed herein.

Also, it is to be noted that FIG. 5 describes operations where the two video streaming platforms 202 and 402 operate in a 1+1 mode, where the video processing at one video streaming platform is duplicated at the other video streaming platform. The disclosed techniques can be applied to a video streaming system operating in a 1:1 mode too. In that case, while the video source 510 arrives at both the active and standby video streaming platforms (e.g., streaming platforms 202 and 402 respectively), only the active video streaming platform assigns a worker to process the media workflow. The standby video streaming platform does not process the media workflow unless/until the worker in the active video streaming platform fails to request to publish or fails to renew the request to publish. Thus, while the task box 1 is the same in the 1:1 mode, at task box 2, the streaming platform coordinator 190 sends only a request to an orchestrator cluster of the active video streaming platform. At task box 3, only the worker in the active video streaming platform is assigned to process the media workflow. Then the worker transmits a request to the streaming platform coordinator 190 to route the video source to the worker at task box 4. At task box 5, the determination of whether to grant the permission is based on whether or not the streaming platform coordinator 190 receives a request to publish from the assigned worker.

Coordination of Publishing

As discussed herein above, when multiple video streaming platforms process a single video source concurrently, the coordination of publishing among the multiple video streaming platforms is important. One goal of the coordination is to have a single instance of the multiple instances of media workflows to output to the content distribution network at a given moment. The reason is that the content distribution network may not be able to synthesize a single congruent media content if more than one instance of the media workflow outputs to the content distribution network at the same time. An operator of the video streaming system may only have a limited access to the content distribution network, thus it is desirable to make the concurrent processing of a media workflow in multiple video streaming platforms transparent to the content distribution network capabilities and configuration. It is also desirable for the streaming platform coordinator to hide the complexities involved in delivering an appropriate SLA for a particular workflow from the client or operator.

Figure 6:
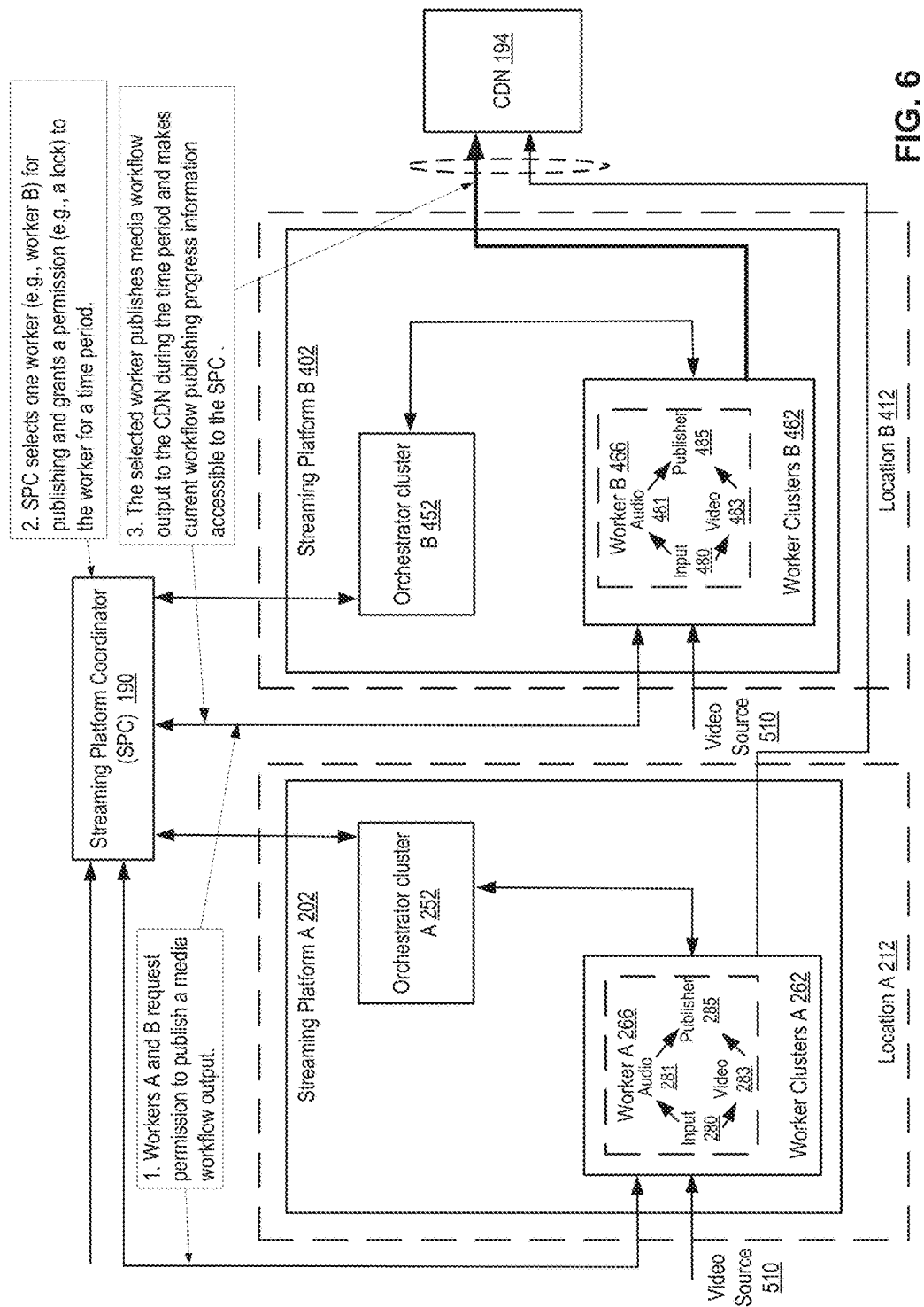
FIG. 6 illustrates operations of coordination of publishing between two video streaming platforms according to one embodiment of the invention.

FIG. 6 illustrates operations of coordination of publishing between two video streaming platforms according to one embodiment of the invention. FIG. 6 is similar to FIG. 5, and the same or similar references indicate elements or components having the same or similar functionalities. Task boxes 1 to 3 illustrate the order in which operations are performed according to one embodiment of the invention.

At task box 1, each of the workers A and B request a permission to publish a media workflow output. The media workflow output is the output of two publishing tasks such as publishers 285 and 485 in the streaming platforms A and B. The requests are sent to the streaming platform coordinator 190 once the workers A and B complete processing of the media workflow.

At task box 2, the streaming platform coordinator 190 selects one worker for publishing and grant a permission to publish to the selected worker for a time period. The selection between the first and the second workers is based on a prioritization scheme in one embodiment. The prioritization scheme may be predetermined by the streaming platform coordinator 190, for example, default to be a worker from a video streaming platform acting as an active role (vs. a standby role by its paired video streaming platform) unless no request is received over a threshold period. The prioritization scheme may be a first come first serve, where the worker whose request to publish the media workflow is received the earliest by the streaming platform coordinator will be granted the permission to publish. The prioritization scheme may be a random selection, round-robin, and other applicable schemes. The disclosed techniques are agnostic to the prioritization scheme of the streaming platform coordinator in one embodiment. In this example, worker B is granted the permission to publish for the time period.

The permission may be granted in a form of a mutex lock. As known in the art, a mutex lock is a lock for mutual exclusion and only one entity will be granted the lock at a given moment. The streaming platform coordinator 190 may send the permission to the selected worker and ignore the other in one embodiment.

In task box 3, the selected worker then publishes the media workflow output of its instance of the media workflow to the content distribution network 194 during the time period. While publishing the media workflow output, the selected worker (worker B in this example) makes current workflow publishing progress information accessible to the streaming platform coordinator 190. In one embodiment, the selected worker writes to a metadata store continuously (e.g., to a database local/external to the video streaming platform) as it publishes. The metadata is then transmitted to the streaming platform coordinator 190 periodically in one embodiment. The current workflow publishing progress information includes information such as the latest publishing network transmissions completed, current network transmissions being performed, and any other state information about the execution of the publish task in the selected worker's instance of the media workflow.

When the time period is close to expiration, the selected worker may renew the permission by sending a request to publish to the streaming platform coordinator 190 again. In one embodiment, the streaming platform coordinator 190 will grant the permission again for one additional time period. For example, the selected worker B is granted a lock to publish for 15 seconds. After 10 seconds (or any other time that the worker deems close to expiration of the time period) from the start of the time period, the worker B will send a request to publish again. The streaming platform coordinator 190 receives the request after 11 seconds from the start of time period, and it grants the worker B 15 more seconds to publish. With the renewal of the grant, the worker B is able to publish continuously for 11+15=26 seconds.

In one embodiment, when the time period is yet to expire and a request to publish the same output is received from another worker that currently does not have the permission to publish, the request from the other worker is denied. Using the same example above where the selected worker B is granted a lock to publish for 15 seconds, during the 15 seconds, if worker A, which was not selected to publish for the media workflow, sends a request to publish the same output of its instance of the media workflow, the request will be denied.

Figure 7:
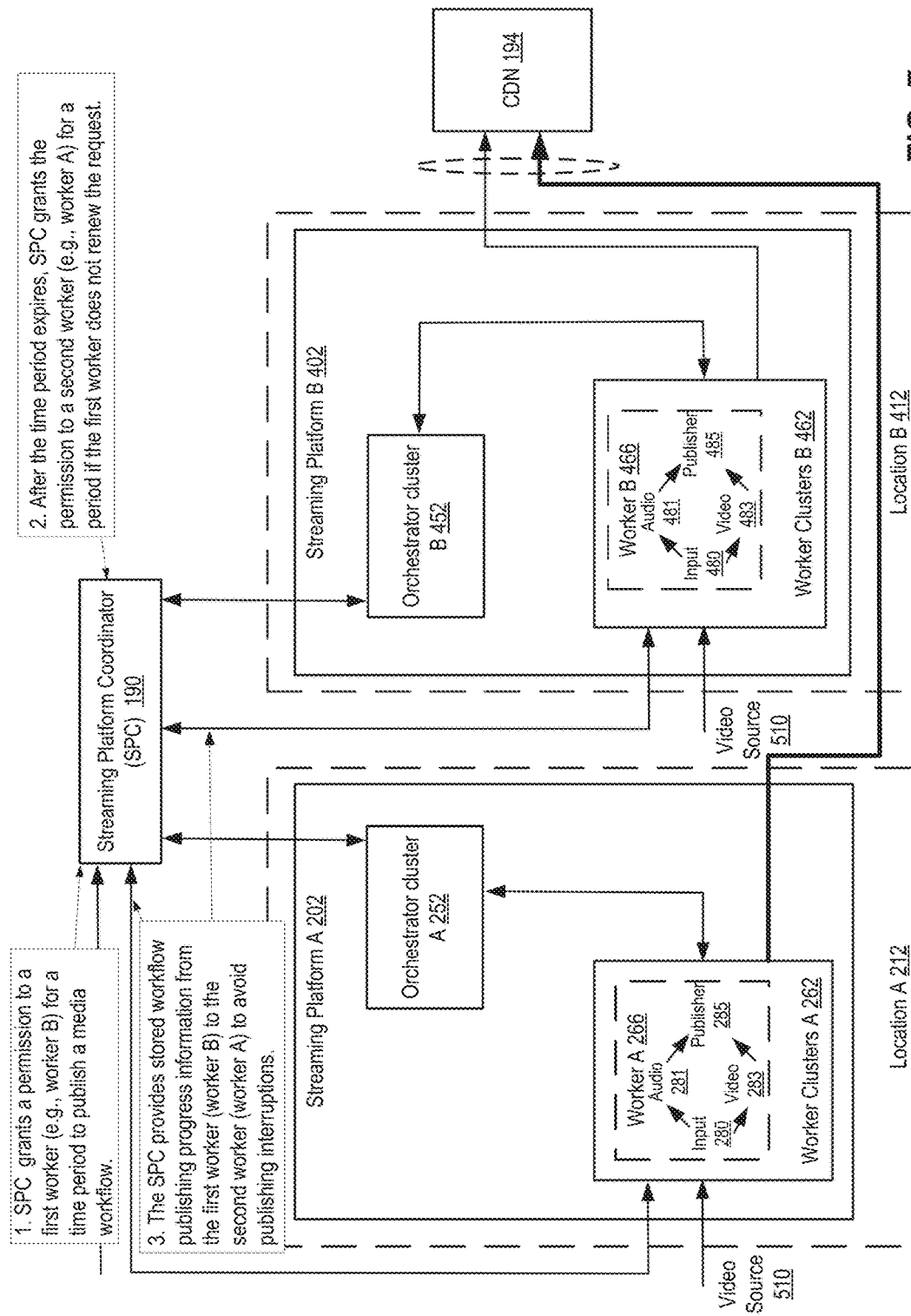
FIG. 7 illustrates operations of failover of publishing between two video streaming platforms according to one embodiment of the invention.

FIG. 7 illustrates operations of failover of publishing between two video streaming platforms according to one embodiment of the invention. FIG. 7 is similar to FIG. 6, and the same or similar references indicate elements or components having the same or similar functionalities. Task boxes 1 to 3 illustrate the order in which operations are performed according to one embodiment of the invention.

At task box 1, the streaming platform coordinator 190 grants a permission to a first worker (worker B in this example) for a time period to publish a media workflow. The operations of granting the permission is the same as discussed in relation to FIG. 6.

At task box 2, after the time period expires, and if the first worker does not request to publish output of its instance of the media workflow and a second worker does request to publish output of its instance of the same media workflow, the streaming platform coordinator 190 grants the permission to publish to the second worker. The first worker not requesting to publish may be due to a variety of reasons, for example, the video streaming platform that hosts the first worker may have a hardware failure or the video streaming platform may perform a maintenance activity. Regardless of the reason, when the first worker is not responsive and the second is responsive once the time period expires, a failover is performed to minimize service outage in one embodiment.

At task box 3, the streaming platform coordinator 190 provides stored workflow publishing progress information (which it received from the first worker) to the second worker to avoid publishing interruptions to the content distribution network 194. As discussed in relation to FIG. 6, a worker with the permission to publish will make the current workflow publishing progress information accessible to the streaming platform coordinator. The streaming platform coordinator may then store the current workflow publishing progress information. Once the failover occurs, and the second worker has the permission to publish, the second worker checks the stored workflow publishing progress information, which contains information for the second worker to continue publishing output of the media workflow. Utilizing the workflow publishing progress information, the second worker will try to publish the output at the point as close as possible to where the first worker failed, thus minimizing publishing interruption.

It is to be noted that when the video streaming system operates in a 1:1 mode, the standby video streaming platform does not process the video source when the active video streaming platform operates normally. However, when the assigned worker in the active video streaming platform fails to transmit a request to publish or fails to renew the request to publish, the streaming platform coordinator activates the standby video streaming platform and makes it begin processing the media workflow. The newly activated video streaming platform will assign a worker (the worker A following the example of FIG. 7), which will request the streaming platform coordinator to route the video source to the worker A. The worker A transmits the request to publish output of its instance of the media workflow, and the streaming platform coordinator will grant the permission for worker A to publish as the streaming platform coordinator has not received the request to publish from worker B. The worker A will utilize the stored workflow publishing progress information and publish the output as discussed herein above.

Flow Diagrams of Fault-Tolerant Video Streaming Processing

Figure 8:
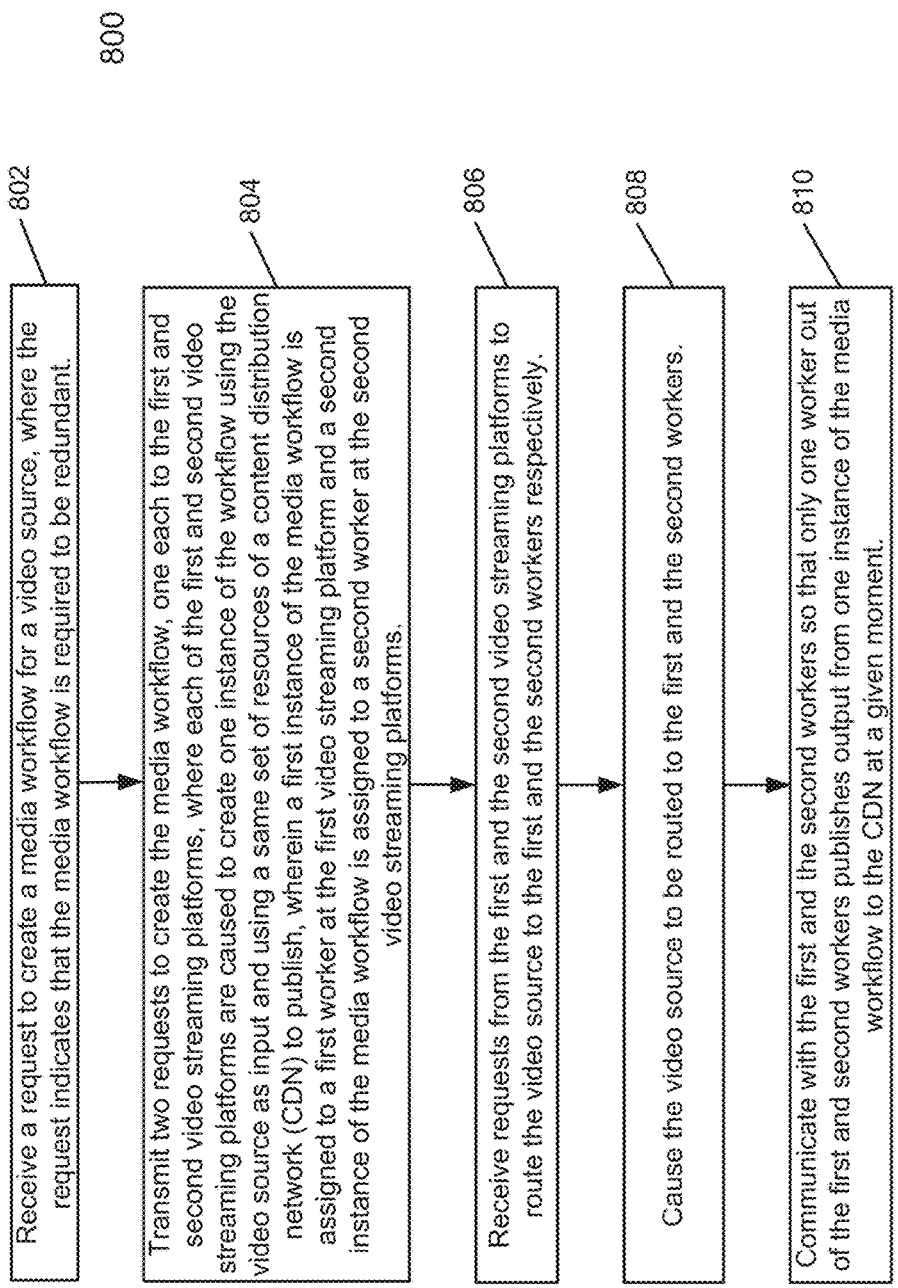
FIG. 8 is a flow diagram illustrating the operations of fault-tolerant video streaming processing according to one embodiment of the invention.

FIG. 8 is a flow diagram illustrating the operations of fault-tolerant video streaming processing according to one embodiment of the invention. Method 800 may be implemented in the streaming platform coordinator 190 as illustrated in FIG. 1. The streaming platform coordinator coordinates at least a first and a second video streaming platform for processing video sources, where at least a subset of the video sources are accessible to both the first video and the second video streaming platforms.

At reference 802, a request is received to create a media workflow for a video source, where the request indicates that the media workflow is required to be redundant. The request may be received at a streaming platform coordinator that coordinates video streaming processing among a plurality of video streaming platforms, including the first and the second video streaming platforms. In one embodiment, the request includes a set of parameters describing characteristics of the media workflow such as video source codec, output audio/video transcoding, and publishing operations. In one embodiment, the first video streaming platform and the second video streaming platform are located at physically separated locations (e.g., miles apart), while in an alternative embodiment, the first video streaming platform and the second video streaming platform are located at the same location but in different installations (e.g., different rack spaces).

At reference 804, responsive to the request received at the streaming platform coordinator, two requests to create the media workflow are transmitted, one each to the first and the second video streaming platforms from the streaming platform coordinator. Each of the first and second video streaming platforms are caused to create one instance of the media workflow using the video source as input and using a common set of resources (e.g. identical entry points) of a content distribution network to publish. A first instance of the media workflow is assigned to a first worker at the first video streaming platform, and a second instance of the media workflow is assigned to a second worker at the second video streaming platform. The first and the second workers then request the video source so they may perform tasks associated with their instances of the media workflow.

At reference 806, requests are received at the streaming platform coordinator from the first and the second video streaming platforms to route the video source to the first and the second workers respectively. At reference 808, the streaming platform coordinator causes the video source to be routed to the first and the second worker. At reference 810, the streaming platform coordinator communicates with the first and the second workers so that only one worker of the first and second workers publishes output from one instance of the media workflow to the content distribution network at a given moment.

In one embodiment, publishing is a task of a task graph created for the instance of the media workflow in each of the first and second video streaming platforms, where the task graph is a directed acyclic graph of tasks with each node of the task graph representing a processing task and each edge of the task graph representing a data flow across two tasks and a corresponding input and output of each task.

Figure 9:
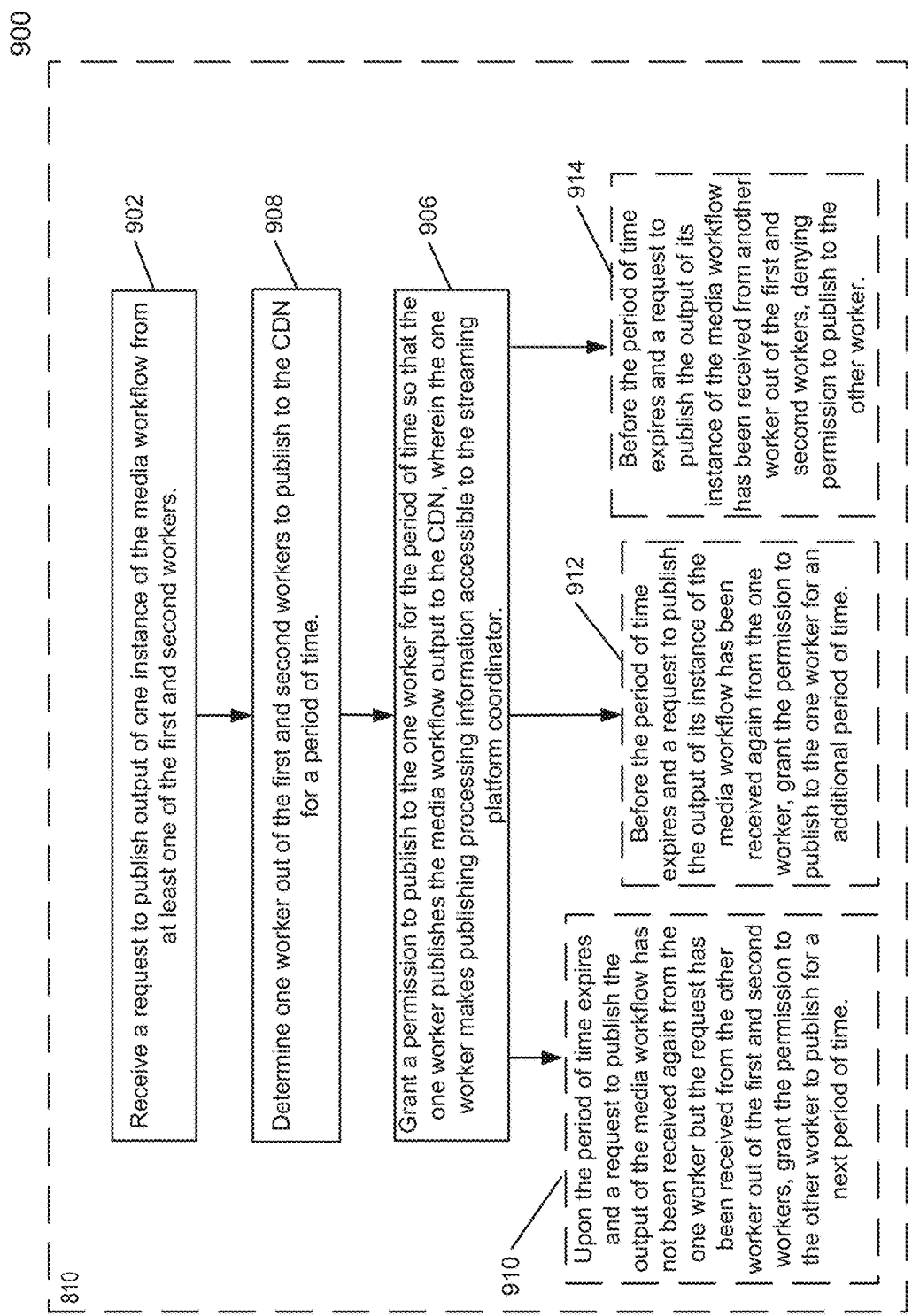
FIG. 9 is a flow diagram illustrating a process of a streaming platform coordinator to cause only one worker to publish output of a media workflow instance according to one embodiment of the invention.

The process of the streaming platform coordinator to cause only one worker to publish output from one instance of the media workflow for the video source can be performed in various ways, and FIG. 9 illustrates one process according to one embodiment of the invention. Method 900 may be one embodiment of reference 810.

At reference 902, a request to publish the output of an instance of a media workflow for a video source is received from at least one of a first and a second workers from two different video streaming platforms. The request is received at a streaming platform coordinator. At reference 904, the streaming platform coordinator determines one worker out of the first and the second workers to publish the output to a content distribution network for a period of time. At reference 906, the streaming platform coordinator grants a permission to publish to the one worker for the period of time so that the one worker publishes the output of its instance of the media workflow to the content distribution network. The one worker also makes current media workflow progress information accessible to the streaming platform coordinator. In one embodiment, the current media workflow publishing progress information is written by the one worker as metadata, and the metadata is transmitted to the streaming platform coordinator periodically. In one embodiment, the determination of the one worker out of the first and the second workers to publish is based on a prioritization scheme, as discussed herein above in relation to FIG. 6.

From reference 906, depending on what the streaming platform coordinator receives from the workers, the flow goes to one of several branches according to embodiments of the invention. When the period of time expires and a request to publish the output of its instance of the media workflow has not been received again from the one worker but the request has been received from another worker out of the first and the second workers, granting the permission to the other worker to publish for a next period of time at reference 910.

Before the period of time expires, if a request to publish the output of its instance of the media workflow has been received again from the one worker, the streaming platform coordinator grants the permission to publish to the one worker for an additional period of time at reference 912. Additionally, before the period of time expires, if a request to publish the output of its instance of the media workflow has been received from another worker out of the first and second workers, the streaming platform coordinator denies permission to publish to other worker at reference 914.

It is to be noted that while the examples in FIGS. 5-7 illustrate one publishing task (publisher 285 and 485) in two instances of the redundant media workflow, it is not uncommon that one single media workflow has two or more publishing tasks thus the single media workflow has two or more outputs to be published to the CDN at a given moment, and the streaming platform coordinator determines one worker for each output at the given moment. Thus two different workers at two different video streaming platforms may publish (each worker publishes a different output) for the single media workflow at the given moment as the streaming platform coordinator makes the determination of one or another worker on per output basis.

Coordination of Video Stream Timing

As discussed herein above, it is desirable to synchronize different video streams when processing these video streams at a video streaming system in some scenarios. From the sources of the video streams such as video output devices (e.g., a set of video cameras placed at various locations of a same event to capture multiple angles of the event), the video streams accumulate different delays along their different paths to arrive at the video streaming system as video sources.

When the video streaming system has full control of the sources of the video streams, the video streaming system may obtain the timing information from the sources of the video streams and use that to synchronize the different video streams. However, typically the video streaming system or its operator does not have control over the sources of the video streams and may not have the ability to alter their audiovisual inputs for one time testing or ongoing synchronization purposes. Additionally, the timing difference between different sources the video streams may not be static. For example, a first video source (output from a video camera hovering over a football stadium) may arrive at the video streaming system one second ahead of a second video source (output from a video camera directing to a goal post of the football stadium) prior to the start of a game. The operator of the video streaming system may cause the two video sources to capture a single sequence of event (e.g., a field goal kick practice by staff during a game's warm-up period), and by comparing the video sources manually, the operator may determine the one second difference between the two video sources and apply the timing offset of the one second to the first video source so that both video sources are processed in synchronization in the video streaming system. During the game, the video sources may be rerouted to different paths due to network condition (e.g., congested network links or failed routing devices in a network such as video routing network 192), and now the second video source arrives one second ahead of the first video source instead. The offset operation needs to be performed in reverse and performing it manually is time consuming if not impossible. Thus, it is desirable to synchronize various video sources automatically.

Figure 10:
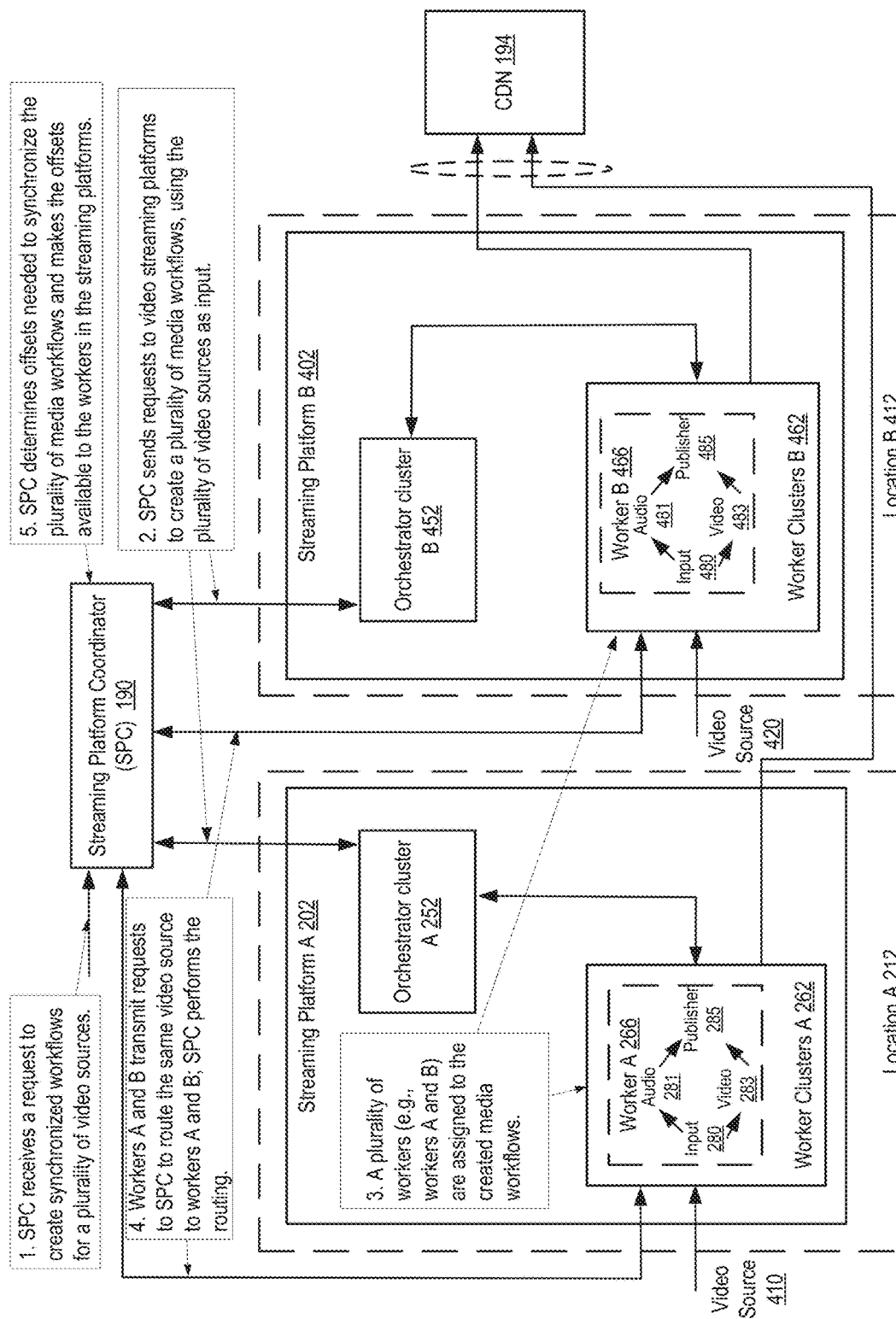
FIG. 10 illustrates operations of timing synchronization between multiple video sources in a video streaming system according to one embodiment of the invention.

FIG. 10 illustrates operations of timing synchronization between multiple video sources in a video streaming system according to one embodiment of the invention. FIG. 10 is similar to FIG. 4, and the same or similar references indicate elements or components having the same or similar functionalities. Task boxes 1 to 5 illustrate the order in which operations are performed according to one embodiment of the invention.

At task box 1, the streaming platform coordinator 190 receives a request to create synchronized workflows for a plurality of video sources. At task box 2, the streaming platform coordinator 190 sends requests to video streaming platforms (streaming platforms A and B in this example but can be more than two) to create a plurality of media workflows, using the plurality of video sources as input. It is to be noted that the streaming platform coordinator 190 may send requests to a single orchestrator clusters when all the media workflows are determined to be created in a single video streaming platform. The selection of one or more video streaming platforms is based on an allocation priority in the streaming platform coordinator and availability of the video streaming platforms. In one embodiment, the plurality of video streaming platforms are located in separate locations. In another embodiment, some or all of the synchronized workflows may each be processed redundantly while being synchronized. In other words, the methods and systems discussed in relation to FIGS. 4-9 may apply to the synchronized workflows.

Referring back to FIG. 10, at task box 3, a plurality of workers (workers A and B in this example but can be more than two) are assigned to the created media workflows. Then at task box 4, the plurality of workers then transmit requests to the streaming platform coordinator 190 to route the plurality of video sources to the plurality of workers. The streaming platform coordinator 190 performs the routing so that the plurality of video sources are routed to the plurality of workers (video sources 410 and 420 are routed to workers A and B at 266 and 466 respectively in this example).

At task box 5, the streaming platform coordinator 190 determines the timing offsets required to synchronize the plurality of media workflows and makes the timing offsets available to the plurality of workers in the video streaming platforms. The streaming platform coordinator 190 transmits the timing offsets to the plurality of workers in one embodiment, so that at least one of the plurality of workers applies the timing offsets to synchronize its processing of the media workflow with others. For example, the application of the timing offsets may be to delay the ingestion of the video source, and it may also be to modify the audiovisual timestamps of the published output of the media workflow so that at the content distribution network 194, all the outputs of the media workflows based on the plurality of video sources are synchronized. The synchronization allows the consumer video playback application (not illustrated) to further process the plurality of video sources efficiently and conveniently, e.g., switching angles of multiple angle video sources to provide viewers best view point of a sporting event.

Figure 11:
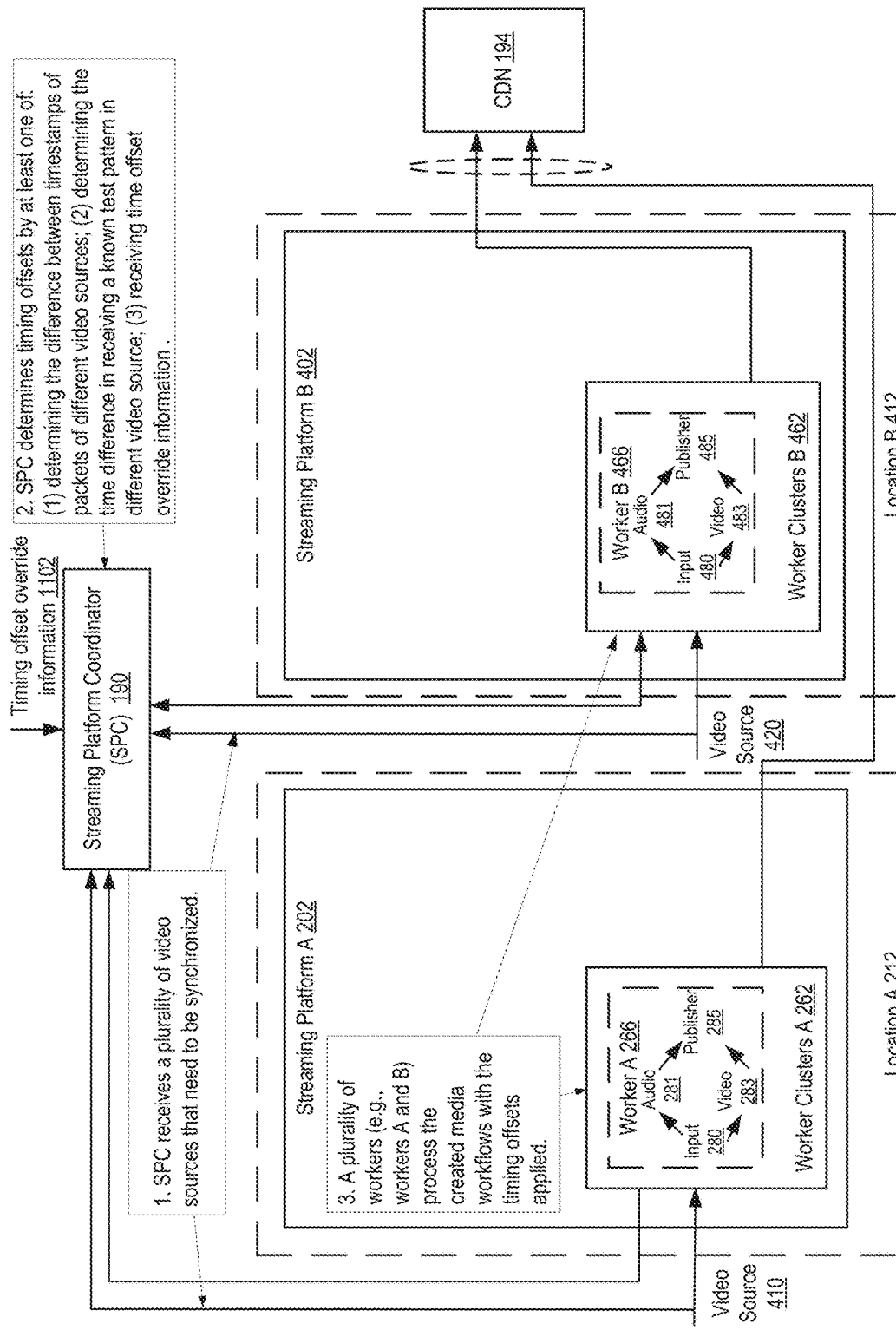
FIG. 11 illustrates ways to determine timing offsets of video sources according to embodiments of the invention.

FIG. 11 illustrates ways to determine timing offsets of video sources according to embodiments of the invention. FIG. 11 is similar to FIG. 10, and the same or similar references indicate elements or components having the same or similar functionalities. Certain aspects of FIG. 10 have been omitted from FIG. 11 in order to avoid obscuring other aspects of FIG. 11. Task boxes 1 to 3 illustrate the order in which operations are performed according to one embodiment of the invention.

At task box 1, the streaming platform coordinator 190 receives a plurality of video sources that need to be synchronized. It is to be noted that in the similar system illustrated in FIGS. 4-7 and 10, the video sources are not transmitted to the streaming platform coordinator 190, while the video sources do so here. With the arrivals of the video sources, the streaming platform coordinator 190 may determine the timing information directly without another entity to derive the information. When the streaming platform coordinator 190 manages a plurality of video streaming platforms (which can be heterogeneous), each video streaming platform may derive timing information from the video sources and deliver the information to the streaming platform coordinator 190. However, since these video streaming platforms may not derive the timing information using the same mechanism, the timing information derived from different video streaming platforms may not be consistent with each other. The inconsistency of the timing information defeats the purpose of synchronizing time of the video source, thus in this embodiment, all of the plurality of video sources are transmitted to the streaming platform coordinator 190.

At task box 2, the streaming platform coordinator 190 determines timing offsets of the video sources in at least one of several ways. Each of the timing offsets is a value of time difference from a reference time, and the timing offsets may be an integer of digital time unit difference in one embodiment.

In a first way, the streaming platform coordinator 190 may determine the difference between timestamps of packets of different video sources. Each packet of a video source may have a timestamp embedded within when the packet is formed at a video output device (e.g., a video camera). For example, a MPEG-TS packet has a presentation timestamp (PTS) that can be used to determine timing of the packet. When that information is extracted, it can be compared with packets of another video source to determine the relative timing offset between the two video sources. The timestamp may also be inserted by a time code generator after a video source originated from the video output device, and extracted at the streaming platform coordinator 190. The timestamp may be in a global positioning system (GPS) timestamp format when the video output device or the time code generator emitted the packet containing the timestamp.

In a second way, a sequence of test patterns may be generated in each of the plurality of video sources, where the sequence of the test patterns is sent simultaneously in all of the plurality of video sources. The streaming platform coordinator 190 then calculates a timing offset for each video source based on when the sequence of test patterns is found in each of the plurality of video sources. Each test pattern may be an audio only, video only, or a combination of audio and video signal, and may be referred to as an audiovisual test pattern.

In a third way, the timing offsets of video sources are known (e.g., through either the first or the second way). The current timing offset information is made available to an external override system. The external override system may examine the timing offset information and determine one or more timing offsets need to be modified. For example, the external override system may include an operator that views the video sources on monitors with the timing offsets being applied to the video sources, and identifies one or more incorrect timing offsets obtained automatically (e.g., through the first or the second way). Then the external override system returns modified timing offset information (illustrated as timing offset override information 1102) to the streaming platform coordinator 190, which retains the modified timing offset information for any impacted media workflow. In this way, the external override system affects only the impacted media workflow and the other media workflows keep their automatically obtained timing offsets.

It is to be noted that one or more of the three ways described above may be integrated in one embodiment as these approaches are not mutually exclusive. Other ways to determine timing information is also possible. With the streaming platform coordinator 190 overseeing the media workflows at all of the video streaming platforms, the streaming platform coordinator 190 may obtain and store the timing offsets from all of the video streaming platforms to achieve synchronization of the associated video sources regardless how many video streaming platforms are involved to process the video sources.

The timing offsets are made available to a plurality of workers that are assigned to process the workflows created for the video sources. At task box 3, the plurality of workers processed the created workflows with the timing offsets applied. The timing offsets may be transmitted to the video streaming platforms (to the orchestrator clusters or the workers themselves) once the values are determined at the streaming platform coordinator 190. The timing offsets may be transmitted at the requests of the plurality of the workers. At the plurality of the workers, the timing offsets are applied at the ingesting of the media workflows (the input task of the task graph) in one embodiment, so that some workflows are delayed to be processed until the determined timing offset for the media workflow expires. In an alternative embodiment, the timing offsets are applied at the time of media transcoding so that a media workflow only publishes audiovisual content with timestamps that have been synchronized relative to the plurality of workflows.

Flow Diagrams of Coordination of Video Stream Timing

Figure 12:
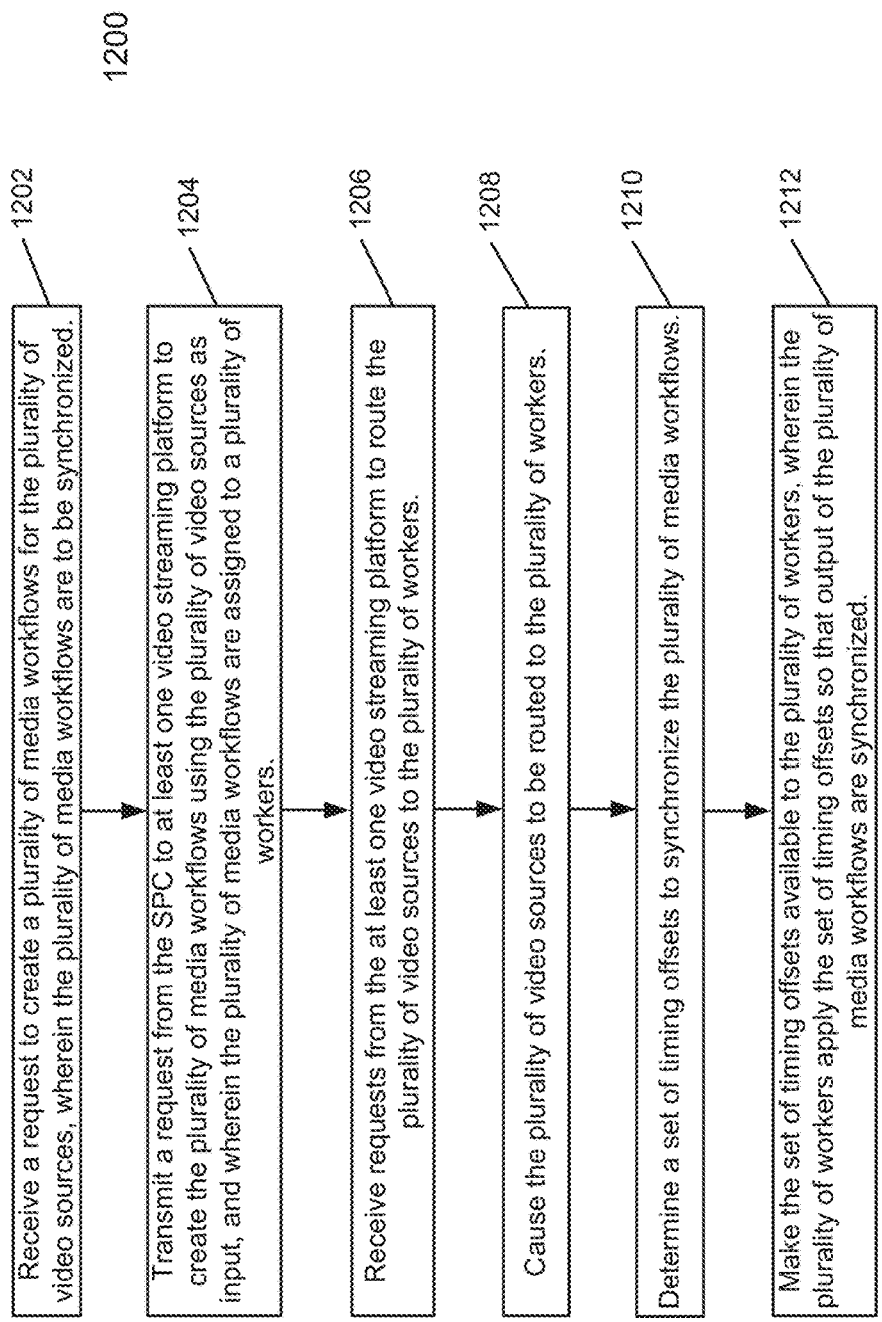
FIG. 12 is a flow diagram illustrating the process of coordinating video stream timing according to one embodiment of the invention.

FIG. 12 is a flow diagram illustrating the process of coordinating video stream timing according to one embodiment of the invention. Method 1200 may be implemented in the streaming platform coordinator 190 as illustrated in FIG. 1.

At reference 1202, a request to create a plurality of media workflows for a plurality of video sources is received at a streaming platform coordinator, where the plurality of the media workflows are to be synchronized. The plurality of video sources are originated from a plurality of video output devices to broadcast an event concurrently. In one embodiment, each of the plurality of video output devices is a video camera. For example, each video camera is one view point of the event, and the multiple cameras are often referred to as forming a multi-angle video view or multi-cam view. The received request may indicate that the plurality of the media workflows are to be synchronized by setting an indication within the request in one embodiment.

At reference 1204, responsive to receiving the request at the streaming platform coordinator to create the plurality of media workflows, a request is transmitted from the streaming platform coordinator to at least one video streaming platform to create the plurality of media workflows using the plurality of video sources as input. The streaming platform coordinator communicates with a plurality of video streaming platforms and thus may determine to transmit the request to two or more video streaming platforms when it is necessary (e.g., based on an allocation priority as discussed herein above). The two or more video streaming platforms are physically separated (e.g., they are at different rack spaces or geographically separated) in one embodiment.

At the at least one video streaming platform, an orchestrator cluster receives the request, and assigns a plurality of workers for the created plurality of media workflows. As discussed herein above, for each media workflow, a task graph is created, where the task graph is a directed acyclic graph of tasks with each node of the task graph representing a processing task and each edge of the task graph representing a data flow across two tasks and a corresponding input and output of each task. The assigned plurality of workers then transmit requests to the streaming platform coordinator to route the plurality of the video sources. At reference 1206, the requests are received from the at least one video streaming platform to route the plurality of video sources to the plurality of workers. At reference 1208, the streaming platform coordinator then causes the plurality of video sources to be routed to the plurality of workers.

At reference 1210, the streaming platform coordinator determines a set of timing offsets to synchronize the plurality of media workflows. Then at reference 1212, the streaming platform coordinator makes the set of timing offsets available to the plurality of workers, where the plurality of workers apply the set of timing offsets so that output of the plurality of media workflows are synchronized.

In one embodiment, making the set of timing offsets available to the plurality of workers includes that each of the plurality of workers requests the streaming platform coordinator for a timing offset; and once the streaming platform coordinator receives the timing offset requests, it transmits a response containing one timing offset for one requesting worker for each timing offset request.

Figure 13:
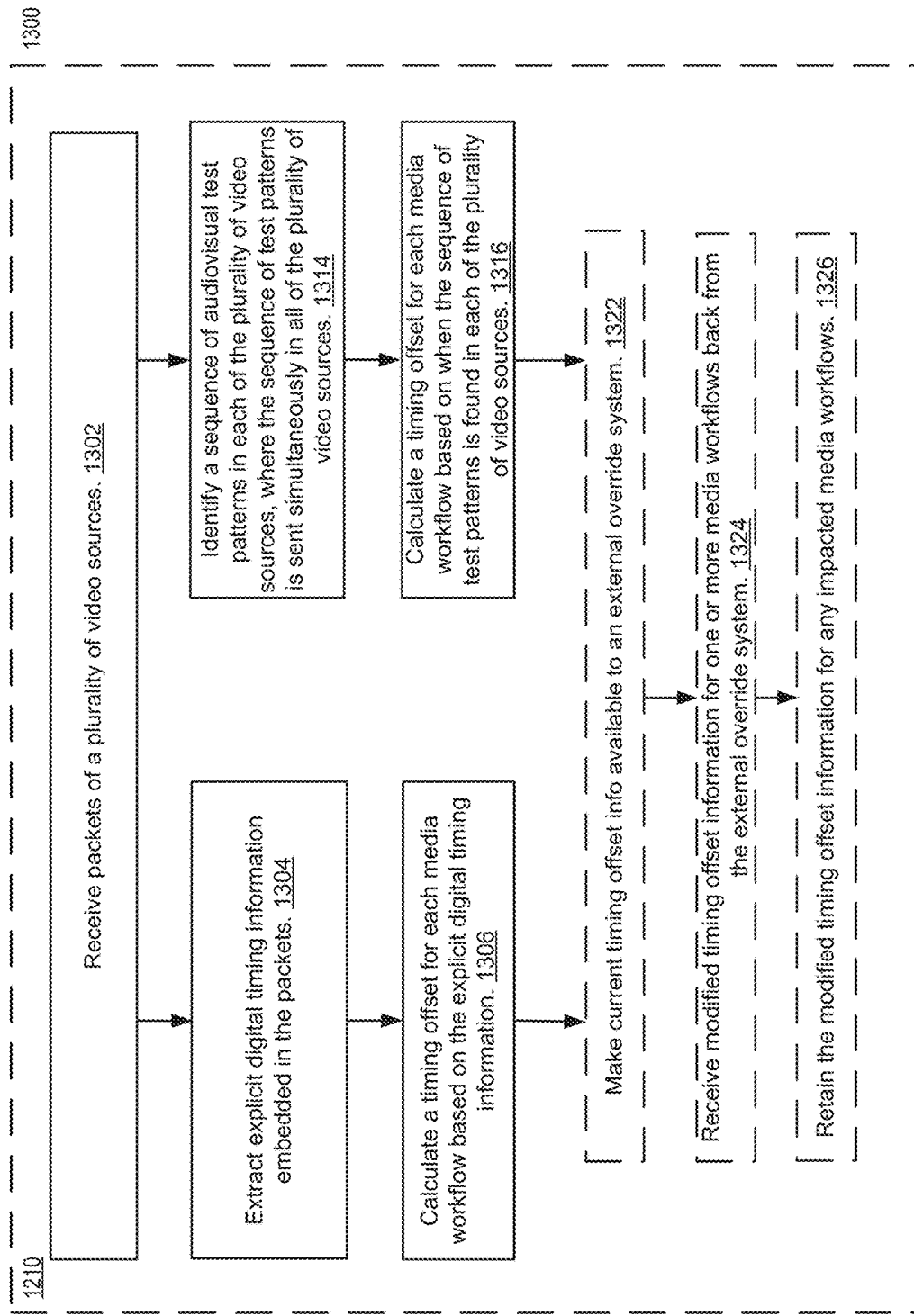
FIG. 13 is a flow diagram illustrating ways to determine the set of timing offsets according to embodiments of the inventions.

As discussed herein above, the determination of the set of timing offsets can be performed in a variety of ways. FIG. 13 is a flow diagram illustrating ways to determine the set of timing offsets according to embodiments of the inventions. In one embodiment, the method 1300 illustrated in FIG. 13 are operations within reference 1210 of FIG. 12.

At reference 1302, packets of a plurality of video sources (such as the ones illustrated in FIG. 12) are received at a streaming platform coordinator. The streaming platform coordinator then extracts explicit digital timing information embedded in the packets of each of the plurality of video sources at reference 1304. The explicit digital timing information may be included in a timestamp of a packet (e.g., included in the packet header or in a specific packet type) that was discussed herein above in relation to FIG. 11. At reference 1306, the streaming platform coordinator calculates a timing offset for each media workflow based on the explicit digital timing information.

In alternative or in addition, after receiving the packets of the plurality of video sources at reference 1302, the flow goes to reference 1314, where the streaming platform coordinator identifies a sequence of audiovisual test patterns in each of the plurality of video sources. The sequence of test patterns is sent simultaneously in all of the plurality of video sources. Then at reference 1316, the streaming platform coordinator calculates a timing offset for each media workflow based on when the sequence of test patterns is found in each of the plurality of video sources.

Optionally, the determined timing offset are stored as current timing offset information in the streaming platform coordinator. At reference 1322, the streaming platform coordinator makes the current timing offset information available to an external override system. The external override system may modify one or more timing offsets for one or more media workflows in the timing offset information. The streaming platform coordinator then receives the modified timing offset information for the one or more media workflows back from the external override system. The streaming platform coordinator then retains the modified timing offset information for any impacted media workflow while not changing other timing offsets for other media workflows at reference 1326.

It is to be noted that operations within references 1322-1326 may be performed without operations within reference 1302-1316, that is, the current timing offset information may be calculated with a method other than the ones described by references 1302-1316. Additionally, operations in the flows of 1302-1304-1306 and 1302-1314-1316 may be performed in the same streaming platform coordinator, and the resulted timing offsets from the two branches may be reconciled and resulted to the timing offsets for the plurality of the media workflows.

While methods 800-900 and 1200-1300 are described separately under different headings, these methods can work together in a single embodiment. For example, a request to create a plurality of media workflows for a plurality of video sources are received at reference 1202, where the plurality of the media workflows are to be synchronized. Each or some of the plurality of media workflow may be required to be redundant too. In that case, those redundant media workflows may be processed at multiple video streaming platforms to offer fault-tolerance (going through operations in methods 700-800) while they may be synchronized with other media workflows using methods 1200-1300 too. The streaming platform coordinator may perform both methods 800-900 and 1200-1300 concurrently for a given set of video sources.

Electronic Devices Implementing Embodiments of the Invention

Figure 14:
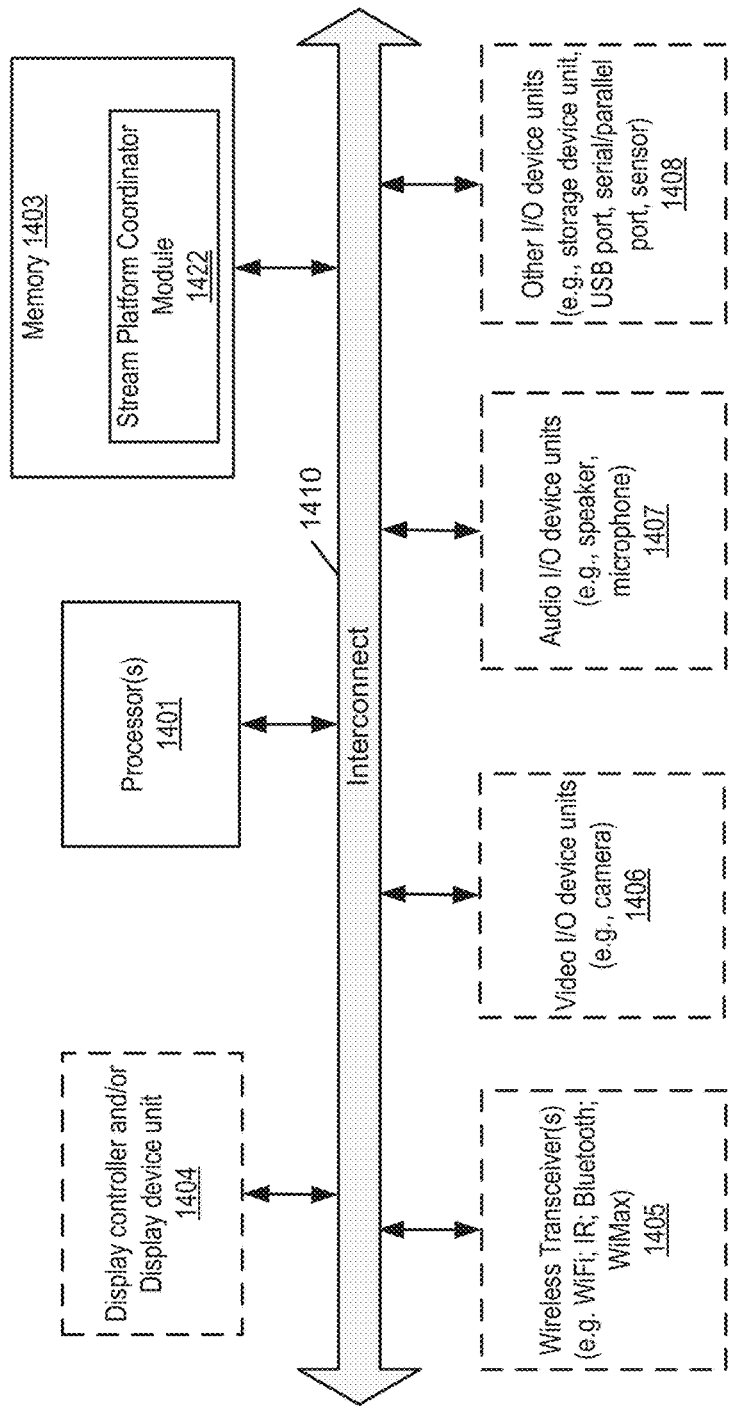
FIG. 14 is a block diagram illustrating an electronic device that may serve as a streaming platform coordinator of a video streaming platform in a cloud computing environment according to one embodiment of the invention.

FIG. 14 is a block diagram illustrating an electronic device that may serve as a streaming platform coordinator of a video streaming platform in a cloud computing environment according to one embodiment of the invention. The electronic device may be a computing device (e.g., a computer server) of a cloud computing environment). The system 1400 may represent the streaming platform coordinator described above performing any of the processes or methods for redundant media workflow processing and/or synchronized media workflows described above. The system 1400 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 1400 is intended to show a high level view of many components of the computing system. However, it is to be understood that additional components may be present in certain implementations and furthermore, different arrangement of the components shown may occur in other implementations.

In one embodiment, the system 1400 includes a processor 1401, memory 1403, and optionally device units 1404-1408 that are interconnected via a bus or an interconnect 1410. A processor 1401 may represent a single processor or multiple processors with a single processor core or multiple processor cores included therein. The processor 1401 may represent one or more general-purpose processors such as a microprocessor, a central processing unit (CPU), or processing device. More particularly, the processor 1401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 1401 may communicate with the memory 1403, which in an embodiment can be implemented via multiple memory devices to provide for a given amount of system memory. The memory 1403 may include one or more volatile storage (or memory) devices such as random access memory (RAM), dynamic RAM (DRAM), synchronous DRAM (SDRAM), static RAM (SRAM), or other types of storage devices. The memory 1403 may store information including sequences of instructions that are executed by the processor 1401, or any other device units. For example, executable code and/or data of a variety of operating systems, device drivers, firmware (e.g., input output basic system or BIOS), and/or applications can be loaded in the memory 1403 and executed by the processor 1401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

The memory 1403 contains a streaming platform coordinator module 1422, which may contain instructions to perform the operations of coordinating fault-tolerant video streaming processing as discussed herein above in relation to FIGS. 1 and 4-9; additionally, the streaming platform coordinator module 1422 may contain instruction to perform the operations of synchronizing timing of video streams as discussed herein above in relation to FIGS. 1 and 10-13. The processor 1401 may instantiate the streaming platform coordinator module to perform operations to coordinate a plurality of video streaming platforms to process video sources redundantly as discussed herein above, and/or synchronize timing of various video sources.

The system 1400 may optionally further include input/output (I/O) devices such as the device units 1404-1408, including display control and/or display device unit 1404, wireless transceiver(s) 1405, video I/O device unit(s) 1406, audio I/O device unit(s) 1407, and other I/O device units 1408 as illustrated. The wireless transceiver 1405 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 1400 may also include an ultrasound device unit (not shown) for transmitting a conference session code.

The video I/O device unit 1406 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 1407 may include a speaker and/or a microphone to facilitate voice-enabled functions, such as voice recognition, voice replication, digital recording, and/or telephony functions. Other optional devices 1408 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 1408 may further include certain sensors coupled to the interconnect 1410 via a sensor hub (not shown), while other devices such as a keyboard or thermal sensor may be controlled by an embedded controller (not shown), dependent upon the specific configuration or design of the system 1400.

The system 1400 may be coupled to a plurality of video streaming platforms such as the streaming platforms 172-174, and the streaming platform may include an orchestrator cluster, a stream coordinator, and one or more worker cluster (working and/or backup), all discussed herein. The system 1400 may perform methods discussed herein above relating to FIGS. 8-9 and/or FIGS. 12-13.

Note that while the system 1400 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams in FIGS. 8-9 and FIGS. 12-13 are described with reference to the exemplary embodiment electronic devices of FIG. 14. However, it should be understood that the operations of flow diagrams can be performed by embodiments of the invention other than those discussed with reference to FIGS. 8-9 and FIGS. 12-13, and the embodiments discussed with reference to FIG. 14 can perform operations different than those discussed with reference to the flow diagrams of FIGS. 8-9 and FIGS. 12-13.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by an electronic device implementing a streaming platform coordinator (SPC) to coordinate processing of a plurality of video sources, originated from a plurality of video output devices to broadcast an event concurrently, the method comprising:
   receiving a request to create a plurality of media workflows, where each of the plurality of video sources correspond to a separate one of the plurality of media workflows, wherein the plurality of media workflows are to be synchronized;
   responsive to receiving the request at the SPC to create the plurality of media workflows, transmitting a request from the SPC to at least one video streaming platform to create the plurality of media workflows using the plurality of video sources as input, wherein the plurality of media workflows are assigned to a plurality of workers;
   receiving requests from the at least one video streaming platform to route the plurality of video sources to the plurality of workers;
   causing the plurality of video sources to be routed to the plurality of workers;
   determining a set of timing offsets to synchronize the plurality of media workflows, where each one of the plurality of media workflows has a separate timing offset in the set of timing offsets; and
   making the set of timing offsets available to the plurality of workers, wherein the plurality of workers apply the set of timing offsets so that output of the plurality of media workflows are synchronized, where the synchronized output has a matched timing correlated to a time of recording by each of the plurality of video sources.

2. The method of claim 1, wherein the request to create the plurality of media workflows using the plurality of video sources as input is to transmitted to at least two video streaming platforms that are located separately.

3. The method of claim 1, wherein determining the set of timing offsets to synchronize the plurality of media workflows comprising:
   receiving packets of the plurality of video sources;
   extracting explicit digital timing information embedded in the packets; and
   calculating a timing offset for each media workflow based on the explicit digital timing information.

4. The method of claim 1, wherein determining the set of timing offsets to
   synchronize the plurality of media workflows comprises:
   receiving packets of the plurality of video sources;
   identifying a sequence of audiovisual test patterns in each of the plurality of video sources, wherein the sequence of test patterns is sent simultaneously in all of the plurality of video sources; and
   calculating a timing offset for each media workflow based on when the sequence of test patterns is found in each of the plurality of video sources.

5. The method of claim 1, wherein determining the set of timing offsets to synchronize the plurality of media workflows comprises:
   making current timing offset information available to an external override system;
   receiving modified timing offset information for one or more media workflows back from the external override system; and
   retaining the modified timing offset information for any impacted media workflow.

6. The method of claim 1, wherein making the set of timing offsets available to the plurality of workers comprises:
   receiving a timing offset request from each of the plurality of workers; and
   transmitting a response containing one timing offset for one requesting worker for each timing offset request.

7. The method of claim 1, wherein each of the plurality of video output devices is a video camera.

8. The method of claim 7, wherein each of the plurality of video sources is one view point of the event.

9. An electronic device to serve as a streaming platform coordinator (SPC) to coordinate processing of a plurality of video sources, originated from a plurality of video output devices to broadcast an event concurrently, the electronic device comprising:

a processor and a non-transitory machine-readable storage medium coupled to the processor, the non-transitory machine-readable storage medium containing operations executable by the processor, wherein the electronic device is operative to: receive a request to create a plurality of media workflows, where each of for the plurality of video sources correspond to a separate one of the plurality of media workflows, wherein the plurality of media workflows are to be synchronized; responsive to receiving the request at the SPC to create the plurality of media workflows, transmit a request from the SPC to at least one video streaming platform to create the plurality of media workflows using the plurality of video sources as input, wherein the plurality of media workflows are assigned to a plurality of workers; receive requests from the at least one video streaming platform to route the plurality of video sources to the plurality of workers; cause the plurality of video sources to be routed to the plurality of workers; determine a set of timing offsets to synchronize the plurality of media workflows, where each one of the plurality of media workflows has a separate timing offset in the set of timing offsets; and make the set of timing offsets available to the plurality of workers, wherein the plurality of workers apply the set of timing offsets so that output of the plurality of media workflows are synchronized, where the synchronized output has a matched timing correlated to a time of recording by each of the plurality of video sources.

10. The electronic device of claim 9, wherein the determination of the set of timing offsets to synchronize the plurality of media workflows is for the electronic device to further operative to: receive packets of the plurality of video sources; extract explicit digital timing information embedded in the packets; and calculate a timing offset for each media workflow based on the explicit digital timing information.

11. The electronic device of claim 9, wherein the determination of the set of timing offsets to synchronize the plurality of media workflows is for the electronic device to further operative to: receive packets of the plurality of video sources; identify a sequence of audiovisual test patterns in each of the plurality of video sources, wherein the sequence of test patterns is sent simultaneously in all of the plurality of video sources; and calculate a timing offset for each media workflow based on when the sequence of test patterns is found in each of the plurality of video sources.

12. The electronic device of claim 9, wherein the determination of the set of timing offsets to synchronize the plurality of media workflows is for the electronic device to further operative to: make current timing offset information available to an external override system; receive modified timing offset information for one or more media workflows back from the external override system; and retain the modified timing offset information for any impacted media workflow.

13. The electronic device of claim 9, wherein to make the set of timing offsets available to the plurality of workers include the electronic device to further operative to: receive a timing offset request from each of the plurality of workers; and transmit a response containing one timing offset for one requesting worker for each timing offset request.

14. The electronic device of claim 9, wherein each of the plurality of video output devices is a video camera.

15. A non-transitory machine-readable storage medium having instructions stored therein, which when executed by a processor, cause the processor to perform operations in an electronic device implementing a streaming platform coordinator (SPC) to coordinate processing of a plurality of video sources, originated from a plurality of video output devices to broadcast an event concurrently, the operations comprising:
receiving a request to create a plurality of media workflows, where each of for the plurality of video sources correspond to a separate one of the plurality of media workflows, wherein the plurality of media workflows are to be synchronized;
responsive to receiving the request at the SPC to create the plurality of media workflows, transmitting a request from the SPC to at least one video streaming platform to create the plurality of media workflows using the plurality of video sources as input, wherein the plurality of media workflows are assigned to a plurality of workers;
receiving requests from the at least one video streaming platform to route the plurality of video sources to the plurality of workers;
causing the plurality of video sources to be routed to the plurality of workers;
determining a set of timing offsets to synchronize the plurality of media workflows, where each one of the plurality of media workflows has a separate timing offset in the set of timing offsets; and
making the set of timing offsets available to the plurality of workers, wherein the plurality of workers apply the set of timing offsets so that output of the plurality of media workflows are synchronized, where the synchronized output has a matched timing correlated to a time of recording by each of the plurality of video sources.

16. The storage medium of claim 15, wherein the request to create the plurality of media workflows using the plurality of video sources as input is to transmitted to at least two video streaming platforms that are located separately.

17. The storage medium of claim 15, wherein determining the set of timing offsets to synchronize the plurality of media workflows comprising:
receiving packets of the plurality of video sources;
extracting explicit digital timing information embedded in the packets; and
calculating a timing offset for each media workflow based on the explicit digital timing information.

18. The storage medium of claim 15, wherein determining the set of timing offsets to synchronize the plurality of media workflows comprises:
receiving packets of the plurality of video sources;
identifying a sequence of audiovisual test patterns in each of the plurality of video sources, wherein the sequence of test patterns is sent simultaneously in all of the plurality of video sources; and
calculating a timing offset for each media workflow based on when the sequence of test patterns is found in each of the plurality of video sources.

19. The storage medium of claim 15, wherein determining the set of timing offsets to synchronize the plurality of media workflows comprises:
making current timing offset information available to an external override system;
receiving modified timing offset information for one or more media workflows back from the external override system; and
retaining the modified timing offset information for any impacted media workflow.

20. The storage medium of claim 15, wherein making the set of timing offsets available to the plurality of workers comprises:
- receiving a timing offset request from each of the plurality of workers; and
- transmitting a response containing one timing offset for one requesting worker for each timing offset request.

* * * * *